(12) United States Patent
Jennings et al.

(10) Patent No.: US 8,173,221 B2
(45) Date of Patent: May 8, 2012

(54) PROTECTIVE COATINGS FOR METALS

(75) Inventors: Hamlin Jennings, Wilmette, IL (US);
Jeffrey J. Thomas, Skokie, IL (US);
Ramille M. Capito, Lake in the Hills, IL (US)

(73) Assignee: MCT Research & Development, Cambridge, MA (US)

( * ) Notice: Subject to any disclaimer, the term of this patent is extended or adjusted under 35 U.S.C. 154(b) by 800 days.

(21) Appl. No.: 12/291,421

(22) Filed: Nov. 10, 2008

(65) Prior Publication Data

US 2009/0239065 A1 Sep. 24, 2009

Related U.S. Application Data

(60) Provisional application No. 61/069,804, filed on Mar. 18, 2008.

(51) Int. Cl.
*B05D 3/02* (2006.01)

(52) U.S. Cl. .................. 427/397.7; 427/397.8

(58) Field of Classification Search .................. None
See application file for complete search history.

(56) References Cited

U.S. PATENT DOCUMENTS

| | | | |
|---|---|---|---|
| 3,499,780 A | 3/1970 | Etherington et al. | |
| 3,625,737 A | 12/1971 | Ricchezza et al. | |
| 3,944,440 A | 3/1976 | Franz | |
| 3,971,674 A | 7/1976 | Brandt et al. | |
| 4,115,607 A | 9/1978 | Hasegawa et al. | |
| 4,125,651 A | 11/1978 | Campbell et al. | |
| 4,169,735 A | 10/1979 | Boberski et al. | |
| 4,225,398 A | 9/1980 | Hasegawa et al. | |
| 4,347,285 A | 8/1982 | Batdorf | |
| 4,379,196 A | 4/1983 | Halper | |
| 4,415,364 A | 11/1983 | Naito et al. | |
| 4,601,796 A | 7/1986 | Powers et al. | |
| 4,762,753 A | 8/1988 | Perfetti | |
| 4,792,358 A | 12/1988 | Kimura et al. | |
| 5,205,874 A | 4/1993 | Crews, IV et al. | |
| 5,306,526 A | 4/1994 | Gray et al. | |
| 5,492,766 A * | 2/1996 | Howard et al. | 428/469 |
| 5,681,383 A | 10/1997 | Andoh et al. | |
| 5,770,315 A | 6/1998 | Wiedemann | |
| H2014 H | 2/2002 | Boulos et al. | |
| 6,358,616 B1 | 3/2002 | Jennings | |
| 6,428,616 B1 | 8/2002 | Neely, Jr. | |
| 6,440,290 B1 | 8/2002 | Vega et al. | |
| 6,455,100 B1 | 9/2002 | Heimann et al. | |

(Continued)

OTHER PUBLICATIONS

Colic et al. Influence of Ion Size on Short-Range Repulsive Forces between Silica Surfaces, Langmuir, 1998 14 (21), pp. 6107-6112 [retrieved on Apr. 23, 2009] Retrieved from the Internet: <URLhttp://pubs.acs.or/dol/abs/10/1021/la980489y> Abstract, p. 1, para 2 and 3; p. 2, para 6 and p. 3, para 1.

(Continued)

*Primary Examiner* — Erma Cameron
(74) *Attorney, Agent, or Firm* — Jonathan T. Goodman

(57) ABSTRACT

Metal products having improved properties and processes for preparing the metal products are provided. In an embodiment, the present disclosure provides for a metal product comprising a metal surface, an oxide layer and a glass layer. The glass layer is provided by coating a stable aqueous silicate or borosilicate solution onto the metal surface and curing the aqueous solution to produce a glass layer. The metal products have surface characteristics that outperform current anodized metal surfaces.

27 Claims, 13 Drawing Sheets

U.S. PATENT DOCUMENTS

| | | |
|---|---|---|
| 6,464,774 B1 | 10/2002 | Satoh |
| 6,500,558 B2 | 12/2002 | Yamaguchi |
| 6,759,087 B1 | 7/2004 | Reuscher |
| 6,817,679 B1 | 11/2004 | Prieto et al. |
| 6,821,631 B2 | 11/2004 | Grantham et al. |
| 6,929,705 B2 | 8/2005 | Myers et al. |
| 6,964,712 B2 | 11/2005 | Wigger et al. |
| 6,986,810 B1 | 1/2006 | Behi |
| 7,851,025 B2 | 12/2010 | Lawlor |
| 2002/0185199 A1* | 12/2002 | Myers et al. ............ 148/537 |
| 2004/0191536 A1 | 9/2004 | Heimann et al. |
| 2004/0194667 A1 | 10/2004 | Reuscher |
| 2006/0147734 A1 | 7/2006 | Cole et al. |
| 2006/0166014 A1 | 7/2006 | Klotz et al. |
| 2008/0118745 A1 | 5/2008 | Endres et al. |
| 2008/0261033 A1 | 10/2008 | Binder et al. |
| 2008/0311362 A1 | 12/2008 | Binder et al. |

OTHER PUBLICATIONS

International Search Report and Written Opinion of the International Searching Authority for International Application No. PCT/US09/37342 dated May 5, 2009.

ProtectAl: More Protection from All the Elements, [originally posted to the Internet on Nov. 13, 2009], Retrieved from the Internet: <URLhttp://acacorp.com/solar/ProtectAL_Information_Sheet.pdf>.

* cited by examiner

PROTECTIVE COATINGS FOR METALS

This application claims the benefit of U.S. Provisional Patent Application Ser. No. 61/069,804 filed on Mar. 18, 2008, the entire disclosure of which is hereby incorporated by reference.

BACKGROUND

Anodizing is an example of a general class of coating known as conversion coatings, in which the metal surface is converted into the coating by means of a chemical or electrochemical process. Other examples of conversion coatings include chromate conversion coatings, phosphate conversion coatings, bluing, and oxide coatings on steel. They are used for corrosion protection, increased surface hardness, to add decorative color, and as paint primers. Conversion coatings can be very thin, on the order of 0.0001 inches (approximately 2.5 microns). Thicker coatings, up to 0.002 inches (approximately 50 microns), are usually built up on aluminum alloys, either by anodizing or chromate conversion. The present disclosure is designed to be used in conjunction with an anodized conversion coating.

Anodizing (or anodising) is an electrolytic passivation process used to increase the thickness and density of the natural oxide layer on the surface of a metal part. Natural oxides are typically rough, irregular, and not continuous, whereas the anodized oxide layer is more uniform. The process derives its name from the fact that the part to be treated forms the anode portion of an electrical circuit in this electrolytic process. The anodizing process is of little use on carbon steel because the iron oxide formed by the process (rust) puffs up and flakes off, constantly exposing new metal to corrosion. But on many other metals the oxide forms as a tightly adhering layer, so that anodizing increases corrosion resistance and wear resistance, and provides a better substrate for adhesion of secondary layers such as paints, primers, and glues than does the bare metal.

Anodic films are most commonly formed to protect aluminum alloys, although processes also exist for titanium, zinc, magnesium, niobium and other metals and alloys. On all these metals, anodic films are generally much stronger and more adherent than most paints and platings, making them less likely to crack and peel. Anodization changes the microscopic texture of the surface and can change the crystal structure of the metal near the surface. Anodic coatings are often porous, thick ones inevitably so. For example, chromic acid and sulfuric acid anodizing processes, commonly referred to as Types I and III, produce pores in the anodized coat. The thick porous anodic coatings can be useful for creating cosmetic effects, because they can absorb dyes. On the other hand, the porous nature of the coating limits the corrosion resistance, and thus a sealing process that fills the pores is often used to improve corrosion resistance and reduce the tendency for staining. However, the sealing process is generally expensive and time consuming. Long immersion in boiling deionized water is the simplest sealing process, although it is not completely effective and reduces abrasion resistance by approximately 20%. Teflon, nickel acetate, cobalt acetate, and hot sodium or potassium dichromate solutions are also commonly used as sealants. The best sealants are chromate-based chemicals that are very toxic and environmentally hazardous. Furthermore, for many applications anodizing and sealing does not provide sufficient protection against corrosion. This is especially true when a very thin anodized layer is used for the purpose of retaining the bright polished appearance of the metal substrate. Such a polished appearance is desirable as a decorative finish and is also required for many applications such as light reflectors.

In review, anodizing is a widely used and effective method of generating a thin, hard, protective coating on metals such as aluminum, titanium, zinc, magnesium, and niobium. The resulting coatings are all porous to some degree, which improves the adhesion of secondary coatings such as paints and which is useful for holding dyes used to color the surface. However, the porous nature of anodized coatings limits their corrosion protection, and thus they are often sealed to close the pores. Presently available sealing treatments are not entirely satisfactory in terms of effectiveness at preventing corrosion, cost, stain resistance, heat resistance, UV resistance, and environmental impact. Thus there is a need for an alternative means of sealing or otherwise improving corrosion resistance and other characteristics of anodized coatings.

SUMMARY

The present disclosure relates to protective coatings for metals and, more particularly, to metals and their alloys having a generally thin oxide layer such as can be formed naturally or by means of an oxidation process such as anodization. In an embodiment, the present disclosure provides for a metal product comprising a metal or metal alloy, an oxide layer on the surface of the metal or metal alloy, and a silicate glass layer on the oxide layer, wherein the silicate glass layer has a thickness of less than about 2000 nm.

In an embodiment, the present disclosure provides for a process for preparing a metal product. The process comprises selecting a metal or metal alloy having an oxide layer, applying a coating of a stable aqueous silicate solution to the metal or metal, drying the alkali silicate coating, and curing the coating on the metal or metal alloy at a temperature of at least about 200° C.

In an embodiment, the present disclosure provides for a coated aluminum metal or coated aluminum metal alloy comprising an aluminum or aluminum metal alloy surface, an oxide layer, and a coating of a borosilicate glass, wherein the borosilicate glass is less than about 1000 nm thick.

In an embodiment, the present disclosure provides for a continuous process for preparing a borosilicate glass layer on an anodized aluminum coil. The process comprises preparing an aluminum coil that includes an anodized aluminum oxide layer, feeding the aluminum coil on a roll coat line, cleaning a surface of the aluminum coil with an alkaline solution or with water, applying an alkali metal silicate solution to a surface of the aluminum coil, and treating the surface of the aluminum coil with heat so that the metal temperature reaches 200-300° C. for at least about 15 seconds.

In an embodiment, the present disclosure provides for a stable aqueous solution comprising a metal silicate having an alkali metal counterion selected from the group consisting of Li, Na, K, and combinations thereof and metal borate having an alkali metal counterion selected from the group consisting of Li, Na, K, and combinations thereof, wherein the solution has a specific gravity ranging from about 1.05 to about 1.30, and the metal borate is present in an amount ranging up to about 5% by weight of solution.

In an embodiment, the present disclosure provides for a process for preparing a stable aqueous solution comprising dissolving a borate into water at a temperature ranging from about 35° C. to about 45° C., dissolving an alkali metal silicate into water, adding the borate solution to the alkali metal solution, and filtering through a 1.2 micron or smaller filter.

Additional features and advantages are described herein, and will be apparent from the following Detailed Description and the figures.

DETAILED DESCRIPTION

Figure 1:
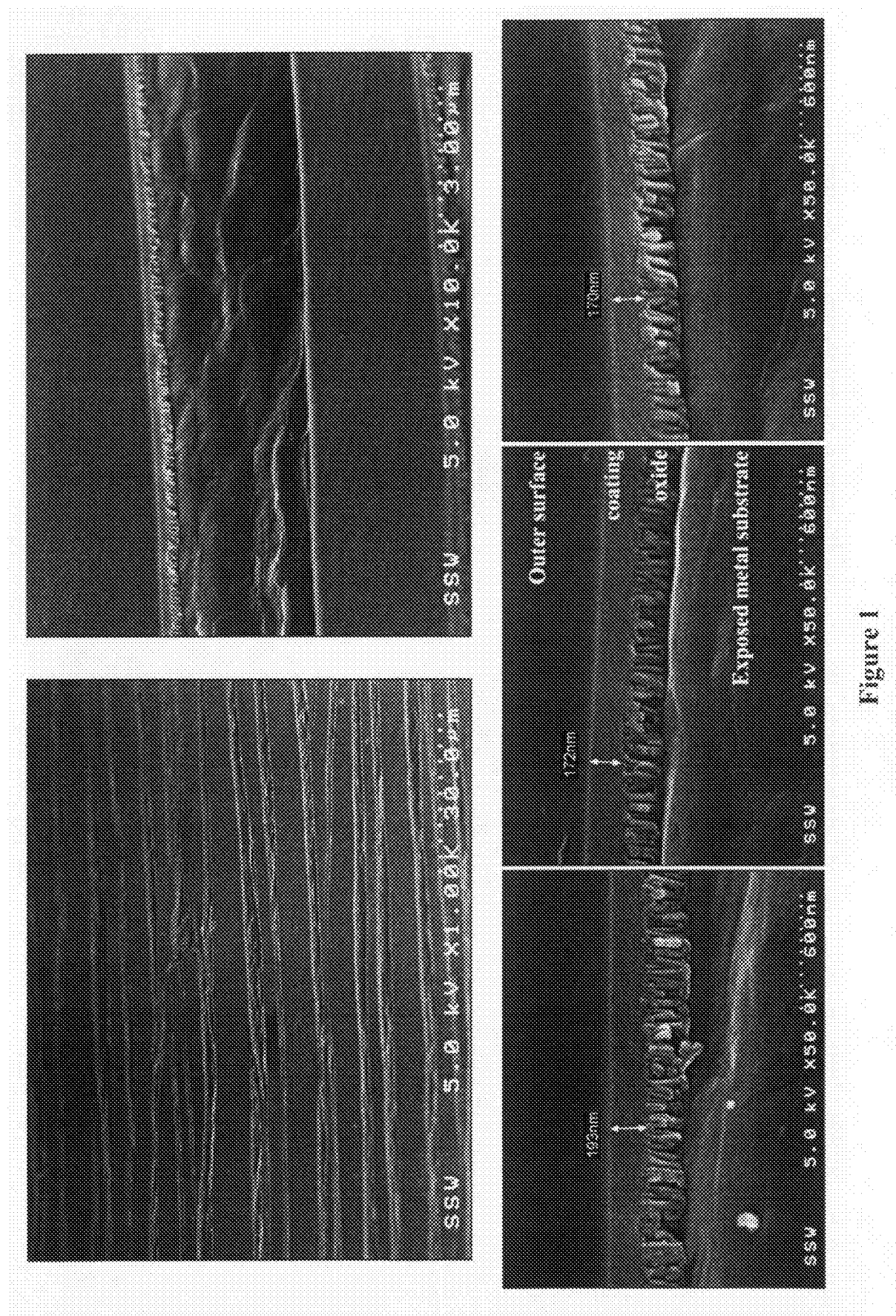
FIG. 1 is a series of SEM photomicrgraphs of metal product of the current disclosure.

The present disclosure is directed to metal products that demonstrate excellent durability and ease of preparation. In a general embodiment, the metal product comprises a metal or metal alloy, an oxide layer on the surface of the metal or metal alloy, and a glass layer on the oxide layer that is a silicate glass or a borosilicate glass.

The metal or metal alloy in the metal product can be any metal that exhibits a tightly adhering oxide layer. A tightly adhering oxide layer is an oxide layer that does not easily flake or peel away from the underlying metal. Examples of metals that exhibit a tightly adhering oxide layer include but are not limited to aluminum, zinc, magnesium, niobium, chromium, manganese, nickel, or lead and alloys of those metals. By way of comparison, iron and carbon steel do not exhibit a tightly adhering oxide layer. The oxide layers on these materials, commonly called rust, flake off thereby exposing new metal to oxidation. Note in comparison that stainless steel does, not exhibit the same limitation as iron or carbon steel and does have a tightly adhering oxide layer. Preferably, the metal or metal alloy is aluminum, titanium, nickel, manganese or chromium and alloys containing those metals. Most preferably, the metal is aluminum or an alloy of aluminum.

The metal product can have an oxide layer on the surface of the metal or metal alloy. A bare metal layer without an oxide layer will perform poorly; however, there are no restrictions on the thickness of the oxide layer. Excellent corrosion resistance can be achieved in the present disclosure with very thin oxide layers. Because this oxide layer does not provide the primary barrier to corrosion, several major advantages become available including, for example, a substantial economic benefit due to reduced energy costs related to anodization or environmental benefits due to reduced utilization of harmful chemicals. Moreover, reducing the thickness of the oxide layer allows for improved properties in the metal system, including for example, improved ductility. In addition, a thicker oxide layer will reduce the reflectance of the underlying metal layer, so thinner oxide layers lead to improved reflectance, a trait commonly desired in metals. Therefore, the oxide layer's thickness can be selected to give the desired performance characteristics in the final product while still providing a high degree of corrosion resistance.

The oxide layer can have a range of thicknesses, including up to about 10 microns. The oxide layer can be less than about 5 microns thick, less than about 3 microns thick, less than about 2 microns thick, less than about 1 micron thick, less than about 0.5 microns thick or less than about 0.25 microns thick. However, the oxide layer is required for the metal product, so it can be greater than at least about 10 nanometers thick, preferably greater than at least 20 nanometers thick, more preferably greater than at least about 50 nanometers thick. In one preferred embodiment, the oxide layer is between about 50 to about 500 nanometers thick. In an alternative preferred embodiment, the oxide layer can range from about 1 to about 2 microns thick, more preferably from about 1.3 to 1.8 microns.

The oxide layer can be generated by any method for preparing oxide surfaces. In one embodiment, the oxide layer can be prepared in a controlled fashion by anodization. Alternatively, the oxide layer can be present from natural oxidation of the metal or metal alloy. However, natural oxide layers are typically not uniform or consistent in thickness, due to conditions in nature that affect the oxidation of the surface. Natural oxide layers are also much thinner than typical anodized oxide layers, for example, approximately 2 to 15 nanometer for a natural oxide layer on aluminum. Preferably, the oxide layer can be generated by anodization. Preparing the oxide layer by anodizing the metal substrate allows for the control of certain desired properties, including for example oxide thickness and oxide layer density. The anodization can occur with a sealing step, or can occur without a sealing step. Any previous or natural oxide layer can be removed prior to controlled oxidation, in a process commonly referred to as brightening. Alternatively the natural or previous oxide layer can be left on the metal or metal surface prior to anodization. Anodization has been used for decades to produce an oxide layer that has advantages over the natural oxide layer present on the metal. This advantage can be due in part to a more organized oxide crystal structure produced during anodization and resulting in a denser or less porous oxide coatings. The anodized coating will then be much more corrosion resistant than the natural oxidation layer. Such anodized oxide coatings have traditionally been favored over natural coatings for these reasons.

The oxide layer can be treated prior to application of the glass layer with dyes, paints or other additives. Because anodization methods can create pores in the oxide layer, those pores can be used for additional desirable compounds, for example dyes, that add color, absorb, defract or reflect light, or provide other desirable properties. Furthermore, due to the nature of the glass layer, the dye will remain sealed in place and will not leach or wash out of the oxide layer, in contrast to the more common methods used to seal oxide layers.

The metal product can have a glass layer above the oxide layer. That glass layer can be a silicate glass or a borosilicate glass. For the purposes of this disclosure, a silicate glass is a polymerized silicate that results from the condensation polymerization of a solution comprising a silicate, and a borosilicate glass is a polymerized silicate containing a boron source that results from the condensation polymerization of solution comprising a borosilicate. Note that an oxide layer without this glass layer will not provide the benefits attributable to the current invention. The glass layer is derived from an aqueous solution of alkali metal silicate compounds that optionally contains a borate compound. Broadly, the aqueous solution is deposited on the metal surface, covering the metal oxide layer, heated to dry, cure and polymerize the silicate-containing layer thereby forming a silicate glass or a borosilicate glass layer above the oxide. In an embodiment, a transitional interface layer can be found between the oxide and the glass layer and comprises chemically bonded mixed oxide-silicate complexes. In an embodiment, the glass layer can be very thin, ranging from about 50 nanometers to about 2000 nanometers, including less than about 1000 nm, less than about 750 nm, less than about 500 nm, less than about 250 nm, or less than about 100 nm. Preferably, the glass layer is less than about 1000 nm, more preferably, less than about 750 nm.

Because of the nature of the relationship between the metal or metal alloy surface, the oxide layer, and the silicate or borosilicate glass layer, the metal product can also be characterized based upon the thickness of the combination of the oxide-glass layer. For example the thickness of the combination of the oxide layer, glass layer and any intervening layers can range from about 0.1 to about 10 microns or about 0.1 to about 5 microns. Preferably, the thickness of the combination of oxide layer, glass layers and any intervening layers can range from about 0.1 to about 3 microns or about 0.1 to about 2 microns. The thickness of the combination of oxide layer, glass layers and any intervening layers can also range from about 0.1 to about 1.0 microns.

The glass layer can be prepared by applying a coating of an aqueous solution containing a metal silicate, then heating the coating to remove water and cure the coating to produce the silicate glass layer. Likewise, the borosilicate glass layer can be prepared by applying a coating of an aqueous solution containing a metal silicate and a metal borate then heating the coating to remove water and cure the coating to produce the borosilicate glass layer. The metal silicates are widely available, and can be commonly purchased as alkali metal silicates in a concentrated liquid form from commercial manufacturers. To this material can be then optionally added a borate and possibly other various chemicals.

The metal silicates are highly soluble, but the borate compounds are less so. Special efforts are required to fully dissolve the borate compounds in the coating solution. In particular, gelling of the coating solution is a common problem associated with combining borate and silicate in a solution. To date, a stable solution comprising borate and silicate, particularly a lithium sodium silicate, has not been disclosed in the literature. This disclosure provides for a stable aqueous solution that contains a borate and a silicate for use in coating metal materials.

The metal silicate can have a metal counterion that is lithium, sodium, potassium, and mixtures thereof, so the metal silicate can be referred to as an alkali, silicate, or an alkali metal silicate. Similarly, the borate can have a metal counterion that is lithium, sodium, potassium, and mixtures thereof. Preferably, the metal counterion on borate is an alkali metal, i.e. lithium, sodium or potassium, and mixtures thereof.

A solution containing a sodium silicate can be described by the silica to sodium weight ratio, and can have a silica to sodium weight ratio ranging from about 1.5 to 3.6, more preferably from about 2.5 to about 3.3. A potassium silicate solution can have a silica to potassium weight ratio, ranging from about 1.6 to about 2.5. A lithium silicate solution can have a silica to lithium weight ratio ranging from about 7 to about 10, preferably about 7.5. One brand of sodium silicate applicable to the current disclosure are the silicates sold by PQ Corp. For example, PQ Type E™ sodium silicate typically has a $SiO_2:Na_2O$ weight ratio of about 3.2. Another example would be PQ Star™ sodium silicate, with a $SiO_2:Na_2O$ weight ratio of about 2.5. An example of lithium silicate would be PQ Lithisil25™ with a $SiO_2:Li_2O$ ratio of about 7.63.

The stable aqueous solution containing metal silicates and metal borates can be also be described by the molar ratio of $SiO_2$ to $M_2O$ present in solution, where M stands for the alkali metal counterions, e.g. lithium, sodium, potassium. In an embodiment, the $SiO_2:M_2O$ mole ratio can range from about 2.3 to about 3.8, preferably greater than 2.3 to about 3.6. In one preferred embodiment, the $SiO_2:M_2O$ mole ratio can range from about 3.0 to about 3.3.

Borates can be any soluble borate compound soluble and stable in water. Preferably, the borate is borax, also known as sodium borate, or sodium tetraborate, typically with ten solvation molecules, i.e. the decahydrate. Other sodium tetraborate hydrates are acceptable as well, and as well as other sources of boron that produce borate in water. While borax is the borate most commonly used, any borate compound that produces a borosilicate glass in combination with silicates is acceptable, provided that a stable aqueous solution can be formed. In an embodiment, the borate can be present in an amount of up to about 5 weight percent versus total diluted solution weight, including between about 1 weight percent to about 5 weight percent, preferably about 1 to about 4 weight percent, and more preferably about 2 to about 3 weight percent. For the purposes of this disclosure, the weight percent given is understood to be a weight percent calculation based on borax. Alternative borate compounds that could be used will have different molecular weights and therefore different weight percentages versus the solution for an equivalent number of moles of borate. One of ordinary skill can determine the ratio of silicate to borate ratio based on the weight percent borax in the present disclosure, and from that ratio determine the corresponding weight percent for the alternative borate compound.

Sodium is important as a component for the formation of a glass polymer, but is often problematic because it causes a haze to form on the glass surface, commonly called efflorescence. This layer is harmless, but does affect the appearance of the glass surface. However, in the absence of sodium, silicate glasses will commonly crack during baking, although baking in typical glass formation (i.e. a kiln) is conducted at much higher temperatures compared to the current process. A mixture containing sodium and another metal counterions can limit the efflorescence while still maintaining the benefits sodium imparts to glass formation. Therefore, in one embodiment, the sodium content of the aqueous solution can be at least about 10 atom %, preferably about 30 atom % of the total metal counterions present in solution. In an alternate embodiment, the solution contains the at least about 30 atom % of sodium versus total metal counterions and at least one other metal counterion that can be lithium or potassium. One of ordinary skill in the art would recognize that the amount of sodium present can originate from sodium silicate as well as any sodium borate added to the solution, in addition to any other sources of sodium counterion. The amount of sodium can also be described as a ratio to other metal ions, for example, a solution that contains lithium and sodium can have a ratio of Na:Li of about 1:9 to about 9:1, preferably 1:2.3 to about 2.5:1, or more preferably from about 1:1.5 to about 1.5:1. Also, because the polymerization to form a glass layer such as a silicate or borosilicate glass results in release of water, the metal ion content of the glass layer-present on a metal product can be equal to the metal ion content of the aqueous solution used to prepare it.

The stable aqueous solutions can be described by the specific gravity of the solutions. In an embodiment, the specific gravity can be from about 1.05 to about 1.3, preferably from about 1.10 to about 1.20, more preferably from about 1.12 to about 1.18, even more preferably about 1.13 to about 1.17, and most preferably about 1.14 to about 1.16. The specific gravity of the stable aqueous solution can be changed by adding or removing water without changing the relative amounts of $SiO_2$ and $M_2O$.

The stable aqueous solution can also contain other additives. For example $C_1$-$C_6$ alcohols can improve the application of the aqueous solution to the metal surface, typically by a wetting effect. Preferably the alcohol can be a $C_3$-$C_5$ alcohol, more preferably a $C_4$ alcohol such as butanol. The alcohol can be present in a concentration of up to about 3% weight, preferably from about 0.5 to about 2% weight. Small amounts of other additives can be used based on the process that the solution can be utilized in. Such additives can be present in an amount of about 0.001 to about 0.005% by volume. For example, defoaming agents can be utilized when the coating is to be sprayed or mixed. One example of a defoaming agent would be DeeFo #916, a commercial additive made by Ultra Additives, but other defoaming agents and other additives known in the art can be used to improve the solution handling characteristics.

In an alternate embodiment, the stable aqueous solution for coating a metal surface can consist essentially of an alkali metal silicate, about 1 to about 5 weight percent borax, water, and a $C_1$ to $C_6$ alcohol, preferably butanol A solution containing a silicate can be created by heating the silicate and water to a temperature of 50-100° C., then adding the other ingredients and agitating to solubilize the additives. After thorough mixing, the solution can be cooled and filtered (1.2 µm filter) to remove particulates, resulting in a clear solution that is stable at room temperature. The solution can also be prepared by dissolving a borate into warm water, preferably about 35° C. to about 45° C., separately dissolving the alkali metal silicate or mixtures of silicates in water, and adding the borate solution to the alkali silicate solution. After cooling and filtration, these aqueous solutions will remain stable at room temperature.

The method for applying an aqueous silicate or borosilicate solution to a metal oxide surface can be any method known in the art for applying solutions to metal surfaces. For example the solution can be sprayed on or brushed on. The metal oxide surface can be roll coated with rollers, or it can be dipped into a solution and drained. Spin coating and other methods of coating a metal with a solution as known in the art are effective as well. In whatever method of coating, the solution leaves a coating on the metal or metal alloy of generally less than about 20 microns. The thickness of the coating can be adjusted by controlling the specific gravity of the solution, for example, increasing the specific gravity can give thicker coatings while decreasing the specific gravity can give thinner coatings.

Notably, in an embodiment, the solution coating present on the metal should be less than about 20 microns. Coating layers that are too thick will bubble and froth during the drying process, resulting in a glass layer that is not smooth and uniform, and does not protect the metal surface or provide the properties of the disclosed coating. The coatings on the metal surface can be dried to remove water, and later polymerized at higher temperatures to generate the polymer glass. That polymerization is a condensation polymerization that produces water, and evolution of the water vapor is limited by the thickness of the coating layer. Frothing and bubbling leave a final polymer glass surface that is not smooth and even. Therefore, one aspect of the disclosure can be coating a solution layer on a metal oxide surface of less than about 15 microns, preferably less than about 10 microns, and more preferably less than about 5 microns. A coating layer of less than about 2 microns can also give an effective glass layer.

After a coating has been applied to a metal oxide, the metal product can be heated to a temperature in the range of about 200° C. to about 500° C. for a few seconds to an hour or more to remove water and foster the chemical conversion of the silicate or borosilicate coatings to a glass layer. Optionally, a lower temperature drying can be performed prior to heating at greater than 200° C. The coating can be cured at a temperature of at least about 200° C., at a temperature of at least about 220° C., or at a temperature of at least about 250° C. Alternatively the coating can be cured between about 200° C. to about 500° C., about 200° C. to about 400° C., or about 250° C. to about 350° C. The coating can be cured for at least about 15 seconds. The heat times and temperature can vary depending on several factors, including, e.g., the coating solution and the coated article. For example, a thin aluminum sheet having a coating solution on its surface can be heated very swiftly and the coating converted to a glass layer in 15 seconds at approximately 290° C. In contrast a thick metal object, such as a metal bar, will require longer heating times because the thermal mass of the bar itself must reach a certain temperature before the coating on its external surface will convert to the glass layer. Without being bound by theory, the temperatures and heat times can be qualitatively evaluated based on the time the metal spends at the relevant temperature, rather than for example the amount of time the metal spends in an oven at the relevant temperature. One of ordinary skill in the art would also recognize that a higher cure temperature can require a short cure time. Conversely, a lower cure temperature may be useful for certain coating solutions.

Because the solution can be easily applied and in some cases swiftly cured, the metal product can be prepared in a continuous manner rather than batch processing, allowing for production advantages. In an embodiment, a coil of metal is prepared by anodizing the surface of the metal. The coil is fed on a roll coat line and the surface of the metal is cleaned. The surface can be cleaned with water, an alkaline solution, or a cleaning solution. The alkali silicate solution is then applied to the surface of the metal coil as it proceeds through the production process, and the surface is subsequently heated to cure the silicate coating. The metal temperature reaches about 200 to about 300° C. for at least about 15 seconds. The coil can be coated and heated on each side separately, on only one side, or on both sides in the same production run. After coating and curing the metal product can be cooled with water and rewound into a coil.

The metal products of this disclosure have numerous advantages over the prior art anodized products. For example, the transparent coating formed by the glass layer-oxide combination allows the metal surface to show through, and does not affect the inherent photometric characteristics of the underlying metal sheet. The inherent photometric characteristics of that surface can include any photometric characteristic desired in the surface including but not limited to, for example, reflectance, brightness, clarity, color, surface textures such as would be present on a brushed nickel, etc. In one embodiment, the total reflectance can be greater than 75%, preferably greater than 80% and more preferably greater than 85%. Alternatively, the loss in reflectance between the underlying metal and the disclosed metal product with the metal-metal oxide-glass layer can be less than about 2%, preferably less than about 1%, more preferably less than about 0.5%. The ability of the metal product to reflect light is primarily limited to the amount of oxide present on the surface of the metal, as the glass layer atop that oxide layer is largely transparent.

The metal product also displays superior corrosion resistance and weatherability. In an embodiment, the metal product displays no corrosion under a neutral salt spray corrosion test as measured by ASTM B-117-37 of greater than about 350 hours, preferably greater than about 600 hours, more preferably greater than about 1200 hours, and most preferably greater than about 3000 hours. In an embodiment, the metal product displays improved corrosion resistance to a acetic acid salt spray test, as measured by DIN 50021 ESS of no corrosion at about 500 hours, minor corrosion of less than about 1% at about 800 hours and minor corrosion of less than about 7% at about 1000 hours.

The heat resistance of the disclosed metal products are excellent. The heat resistance of the metal product is limited by the sensitivity of the underlying metal and not the glass layer. Metal products can be held in an oven at 350° C. for over ten hours. A metal product can be heated with a propane torch up until the metal layer begins to melt, leaving a clear glass layer. Therefore, in an embodiment, the metal product can have an extended heat resistance of up to about 350° C., up to about 500° C., up to about 700° C., or up to about the melting point of the metal substrate.

Hardness and scratch resistance of the disclosed metal products are also excellent. In an embodiment, the metal product can have a pencil hardness of greater than 6, preferably greater than 7, more preferably greater than 8. By way of example, the metal product with an 0.75 micron thick glass layer has the same scratch resistance as a 4 micron thick oxide layer prepared by anodizing and sealing a metal surface. At the same time, the metal product of the disclosure shows limited attack by a 70° C. 8% sodium hydroxide solution after 5 minutes, but the 4 micron thick anodized metal shows deterioration at 1 min and complete dissolution after 2 to 3 minutes.

The metal product of the current disclosure also provides advantages beyond corrosion resistance. For example, many metals have inherent corrosion resistance or hardness, e.g. stainless steel, titanium. Coating these metal surfaces yields other improved properties. For example, the overall appearance of a metal surface will degrade under standard environmental conditions when pollutants, e.g. soot, grime, etc., accumulate on or within the pores of a surface coating. Residual oils from fingerprints are problematic as well. Removing these pollutants by cleaning is often problematic even for relatively smooth oxide surfaces because the pollutants accumulate in the microscopic pores of the metal surface. Coating these materials with the product of the current disclosure improves maintenance of these surfaces by, for example, making cleaning easier, in part because the surface of the glass layer is much smoother. Metal oxides have pores on the size scale of microns, whereas the glass layers have pores several orders of magnitude smaller, on the order of nanometers. Such a coating could be applied to, for example, architectural designs or sculptures, or reflective surfaces such as solar reflectors.

In addition the metal product of the current disclosure demonstrates numerous other advantages in terms of processing. Generally, anodization requires substantial amounts of energy, and while a thicker oxide layer can impart more protection, creating a thicker oxide layer requires much longer anodization, and also results in a gray color and loss of the underlying metal surface characteristics, such as high reflectance. Anodized oxide layers must also be sealed by processes that requires more energy, for example boiling water or salt precipitation and swelling. The best oxide layers are prepared by treating an anodized layer with chromates, but the toxicity of the chromium salts has been well documented and makes this process highly undesirable. Alternatively, some oxide layers can be protected by treating with an epoxy, but volatile organic carbon emissions are also problematic, and the epoxy-protected product will not exhibit the other improved characteristics of the present disclosure.

In contrast, as demonstrated in the disclosure above and further set forth in the examples below, the disclosed glass layer on a metal product having an oxide coating overcomes these deficiencies. It reduces cost by requiring only very thin oxide layers, maintains clarity and other metal properties, provides superior corrosion resistance, faster processing through faster heating and cooling cycles, and avoids the environmental costs associated with heavy metals or VOCs. It also provides for a metal product with a surface that is smoother than anodized oxide layers, has smaller pores compared to the anodized oxide, and is also more uniform and flatter than the anodized oxide layer.

EXAMPLES

By way of example and not limitation, the following examples are illustrative of various embodiments of the present disclosure and further illustrate experimental testing conducted.

Example 1

A typical method of treating or coating an anodized aluminum or aluminum alloy surface with a hard, heat and corrosion resistant transparent coating is described as follows:

An anodized metal panel can be first cleaned with detergent (i.e. Simple Green), rinsed with water, and dried by air or with a dry clean cloth. The surface of the panel can be torched (exposed to the open flame of a butane torch for a few seconds) to remove surface moisture, and dehydrate any hydroxides) and then cooled to a temperature between 30 to 60° C. The panel is then immersed in an aqueous sodium silicate solution (for example, a $SiO_2:Na_2O$ weight ratio of 3.22) diluted to a specific gravity between 1.02 to 1.3 with water. To improve both appearance and corrosion resistant properties, an aqueous solution of sodium tetraborate decahydrate (borax) can also be added to the sodium silicate solution for a final borax concentration between 1 to 5 wt %. Borax powder can alternatively be added directly to a diluted sodium silicate solution with agitation and elevated temperature (between 50-100° C.). The supplements 1-Butanol (n-Butyl Alcohol) at 0.5-2 wt % and DeeFo #916 (Ultra Additives) at 0.001-0.005 vol % can be subsequently added to alter the wetting properties of the silicate solution. The solution can then be filtered (i.e. through a 1.2 μm filter) to remove any particulates. The metal sample can be dipped or submerged in the sodium silicate solution (i.e. 1 second to 30 minutes) and then carefully pulled out. The coating can be either dried at room temperature or immediately placed in a heated oven. The temperature of the sample can be allowed to reach a temperature between 200-350° C. for 30 seconds to an hour. The cured coated sample can be cooled at room temperature or quenched in an aqueous solution.

Example 2

An aluminum panel containing an oxide layer can be coated with a silicate coating prepared according to Example 1 by roll-coating an aluminum sheet having an oxide layer with a solution of sodium borosilicate solution. The coating solution can be heated to between 200-350° C. for 1 hour.

Example 3

An aluminum automobile wheel rim having a silicate glass layer was prepared in a manner analogous to Example 1. The wheel rim was dipped in a sodium borosilicate solution, rotated as the excess solution was drained off to ensure an even coating, and heated in an oven at between 200 and 350° C. for 20 minutes.

Example 4

A titanium panel having an oxide coating was coated using a solution prepared according to Example 1. The tile was coated with a sodium borosilicate solution by dipping, and heated in an oven between 200 and 350° C. for 1 hour.

Example 5

An anodized stainless steel bar of a composition typically used in aircraft landing gear was coated by dipping into a sodium borosilicate solution analogous to the solution in Example 1. The bar was removed, allowed to dry, and heated in an oven at between 200 and 350° C. for 1 hour.

Example 6

This example demonstrates a solution useful for preparing coated metal objects having a silicate glass.

An alkali-borosilicate solution containing a mixture of sodium and lithium metal counterions was prepared. First, concentrated commercial liquid sodium silicate and lithium silicate solutions were combined. Then borax (sodium tetraborate decahydrate) was fully dissolved into warm water. The borax solution was then added to the alkali-silicate solution to create the coating solution. The final borax composition in the coating solution can be between 1-5% by weight. In one example, the final solution composition was 13.0% $SiO_2$, 1.7% $Na_2O$, 1.2% $Li_2O$, 1.1% $B_2O_3$, and 83.0% $H_2O$ by weight, had a specific gravity of about 1.15 at about 3 weight percent borax. The solution was filtered through a 1.2 mm filter. Panels were dip-coated and baked as described in Example 1.

Example 7

This example demonstrates a solution useful for preparing coated metal objects having a silicate glass layer.

A sodium silicate solution having a specific gravity of approximately 1.17 was prepared by dissolving 1.389 kg of borax in 24.25 L warm water, separately diluting 15.75 L of a sodium silicate having a specific gravity of 1.4 in 24.25 of water, and adding the aqueous borax solution to the diluted sodium silicate solution, followed by filtration.

Example 8

This example demonstrates a solution useful for preparing coated metal objects having a silicate glass layer.

A sodium lithium silicate solution having a specific gravity of approximately 1.146 was prepared by heating 45.1 L of water to 35-40° C. in a small black drum, dissolving 3400 g of borax in the heated water, mixing 11.8 L of a sodium silicate and 43.1 L of a lithium silicate in a medium aluminum drum, and then adding the aqueous borax solution to the sodium lithium silicate solution. The solution was filtered and stored.

Example 9

The example demonstrates alternative procedures for preparing the silicate glass layer.

A two-step bake procedure can be used to improve coating properties or prevent cracking of thicker coatings. After the sample is coated, it is placed in a heated oven and allowed to reach a temperature between 100-200° C. for 15 seconds to 1 hour. Subsequently, it can be placed directly into the higher temperature oven and baked a second time at 200-350° C. for 1 minute to an hour.

Alternatively, prior to the second baking, the sample can be further treated, for example by coating with other solutions, e.g. $CaCl_2$ solutions, or by dipping in an acid solution (i.e. acetic acid, pH 2-3) at a temperature between room temperature and 55° C. for 1-15 second, draining, and rinsing with water. The sample can then be baked a second time as described above.

After the final bake, the polymerization process can be improved by an acid treatment. Also the appearance and efflorescence of the coating can be improved with an acid treatment and/or cleansing step after the bake treatment. The treatment involves dipping the sample in an acidic solution (i.e. acetic or phosphoric acid, pH 2-3) at a temperature between 20-60° C. for 1 to 15 seconds while the sample is still hot or after it has cooled following the cure treatment. The coated surface can also be cleaned after it has cooled from the bake step with a commercially available basic cleaner (i.e. Simple Green or Lime Away) followed by a final rinse in water.

Example 10

A method of coating an anodized aluminum coil with a hard, heat and corrosion resistant transparent coating by a roll coat process in a large-scale production line is as follows:

An aluminum coil was fed into the roll coat line at a rate of 80-150 feet per minute where it was first rinsed in hot water (or cleansed in an alkaline solution). A pickup roller was partially submerged in a reservoir of coating solution prepared according to Example 1 or Example 6. The pickup roller transferred the coating solution to a coating roller. After being cleaned, the aluminum sheet was passed over the coating roller, becoming coated with a thin layer of solution. Once coated, the coil underwent a heat treatment so that the metal temperature reached between 200 and 300° C. for 15-60 seconds. After the coating was cured, the surface of the coating was quenched with water and the metal was immediately wound back into a coil.

In a different production run, the aluminum sheet was coated on both; sides by first rolling one side, then rolling the opposite side and then heat treating the coil so that the metal temperature reached between 200 and 300° C. for 15-60 seconds.

The thickness of the silicate coating on the coiled aluminum can be altered by adjusting the specific gravity of the silicate solution and/or the parameters of the roll coating procedure. Furthermore, the rate at which the coil passes through the process and/or the oven temperature can be adjusted to find the optimal cure treatments specific to the type of metal coil being coated.

In all of the above cases it is important to note that if the coating is insufficiently cured, a second heat step can be conducted.

Example 11

Scanning Electron Microscope Images

Figure 2:
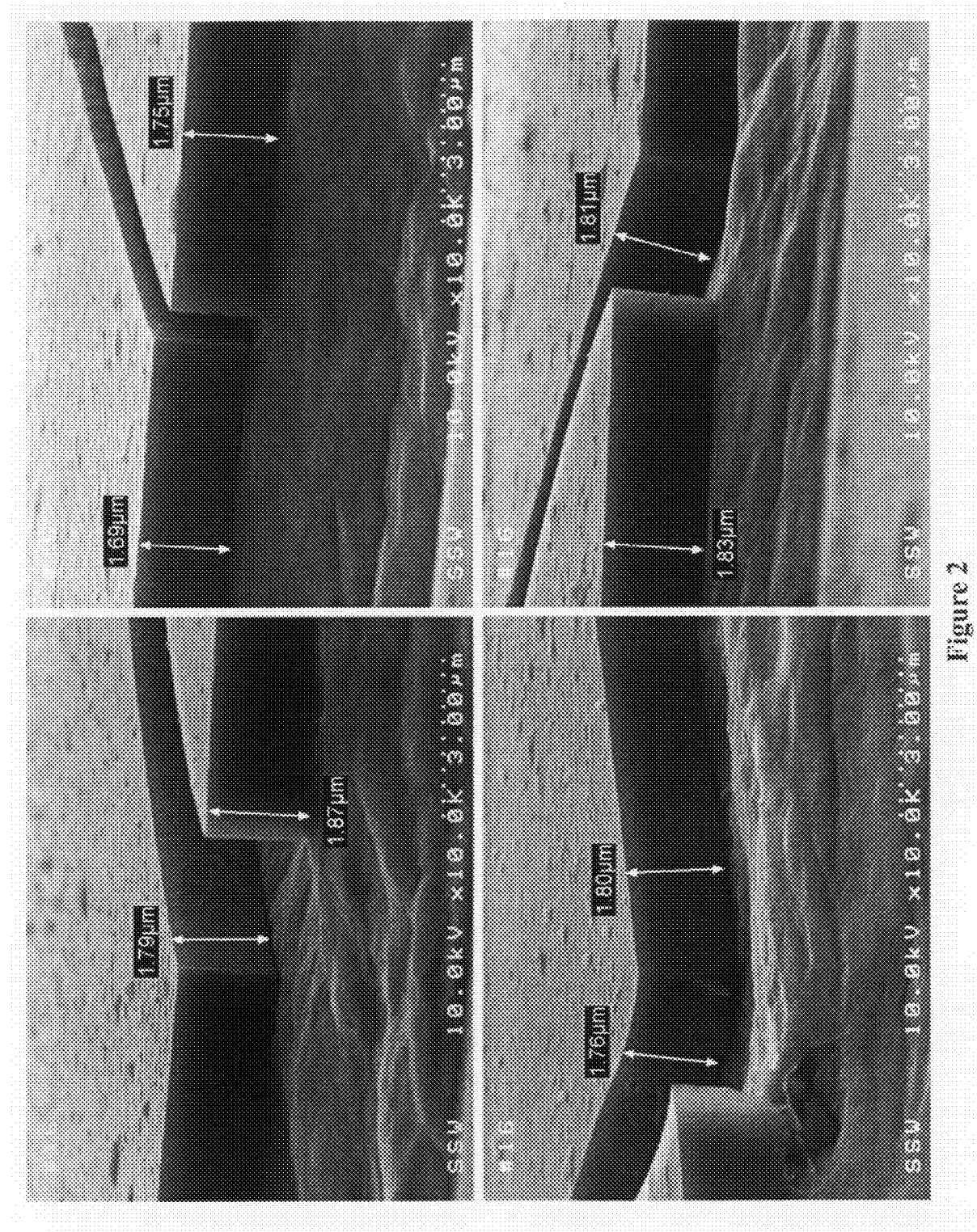
FIG. 2 is a pair of SEM photomicrographs of a metal product of the current disclosure.

FIGS. 1 and 2 are SEM images of the coating as applied to aluminum in a roll coating process. The coated aluminum sample was dipped into liquid nitrogen and fractured. In each SEM image in FIG. 1, the underlying aluminum substrate is in the lowermost image portion. A porous anodized aluminum oxide layer overlays the aluminum substrate and has a thickness in the range of about 0.17-0.19 microns. A thin top layer of thickness of approximately 170-200 nm consisting of a alumina-silicate transition region and the outer glass layer covers the oxide layer. Similarly, in FIG. 2, the SEM images depict a thicker less porous aluminum oxide layer, the alumina-silicate transition layer, and the top coating of a silicate glass layer with the layers merged along an interface. The three composite layers including the $Al_2O_3$ have a thickness in the range of 1.69 to 1.83 microns with the transition layer and the silicate glass layer comprising on the order of 5% to 10% of the thickness.

Figure 3A:
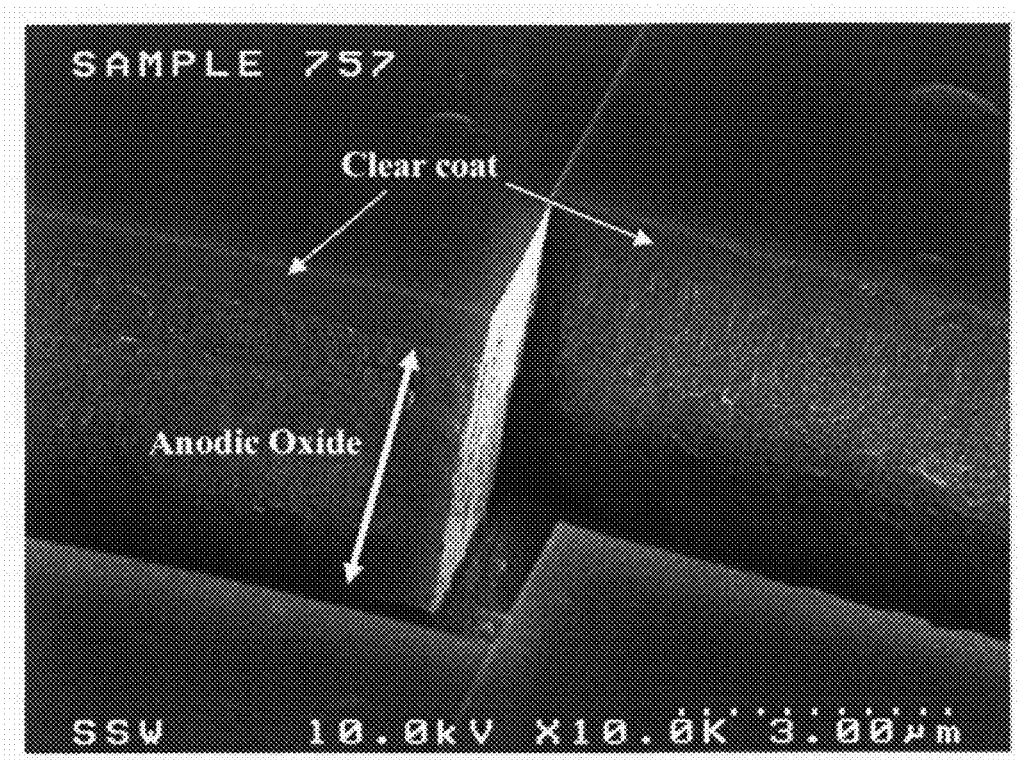
FIG. 3 is a pair of SEM photomicrographs of a metal product of the current disclosure.
Figure 3B:
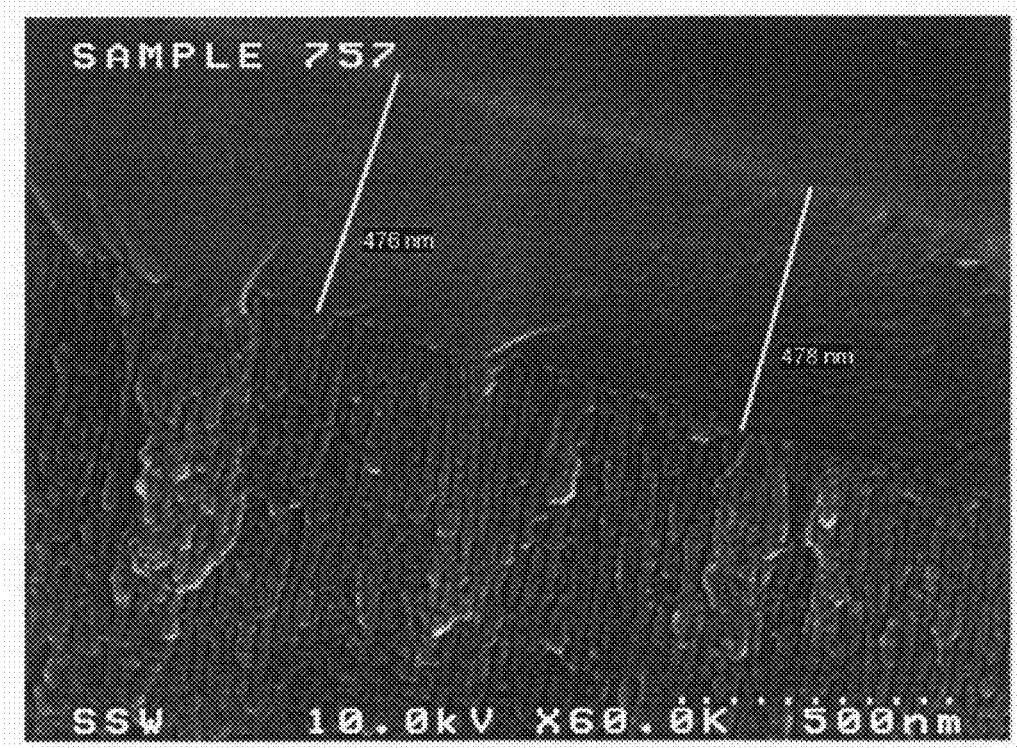
Figure 4A:
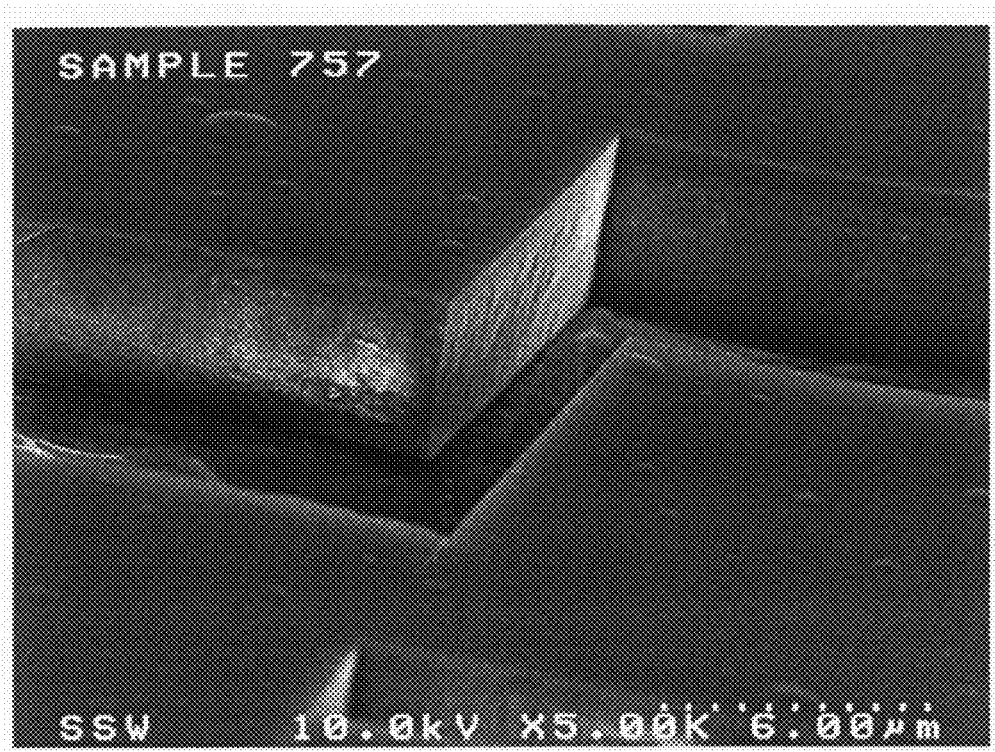
FIG. 4 is a pair of SEM photomicrographs of the metal product, displayed in FIG. 3.
Figure 4B:
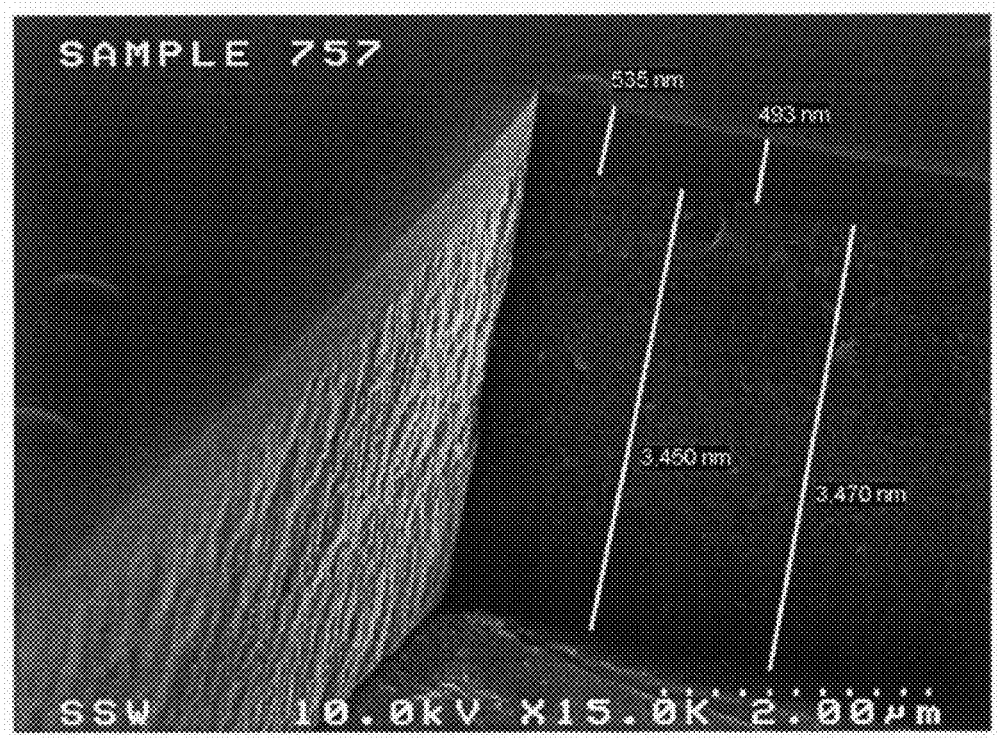

FIGS. 3-8 are SEM images of the silicate glass coatings on aluminum, as prepared according to this disclosure. In FIGS. 3 and 4, the SEM images of the surface and cross section of a freeze-fractured material can be seen. The smooth surface of the silicate glass layer can be seen atop an anodic oxide layer, where the oxide layer is approximately 3.5 μm in thickness, and the silicate glass layer is about 500 nm thick. Note that the thickness of the silicate layer can vary somewhat. In the SEM images, the values measured are from 476 to 535 nm. In part this is due to instrumental error, but it also reveals an advantage to the current disclosure. The surface of an anodic oxide is not perfectly flat, but in fact varies, while the silicate coating on top of the oxide layer is much smoother and flatter. Consequently, variations in the thickness of the silicate coating layer may be observed, but the average thickness will remain largely constant.

Figure 5A:
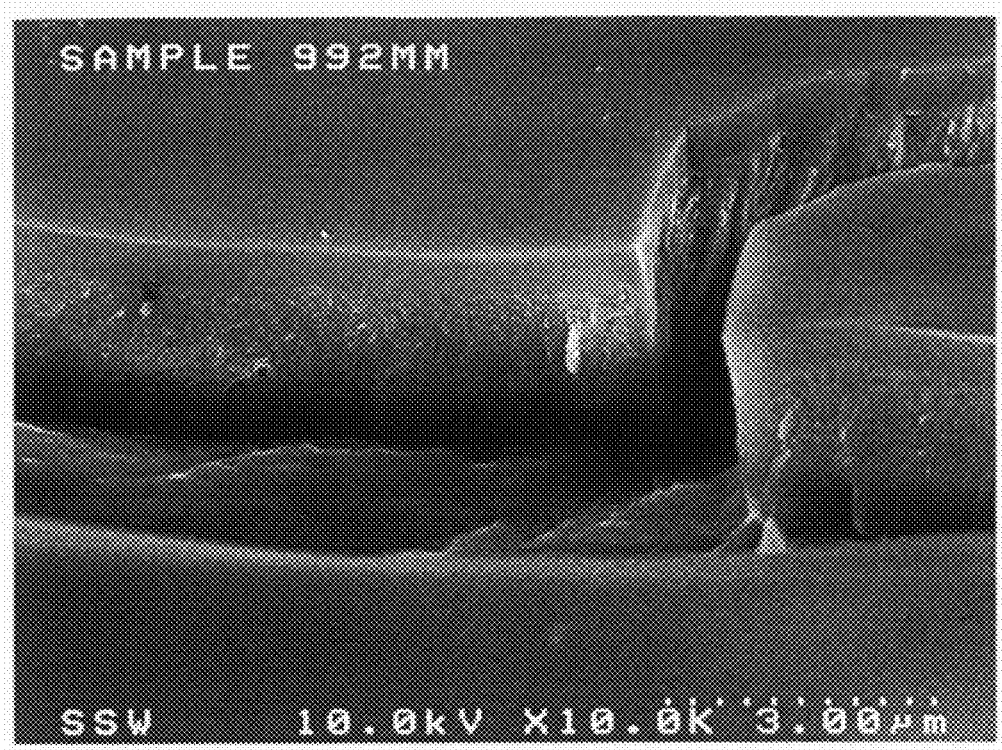
FIG. 5 is a series of SEM photomicrographs of a metal product of the current disclosure.
Figure 5B:
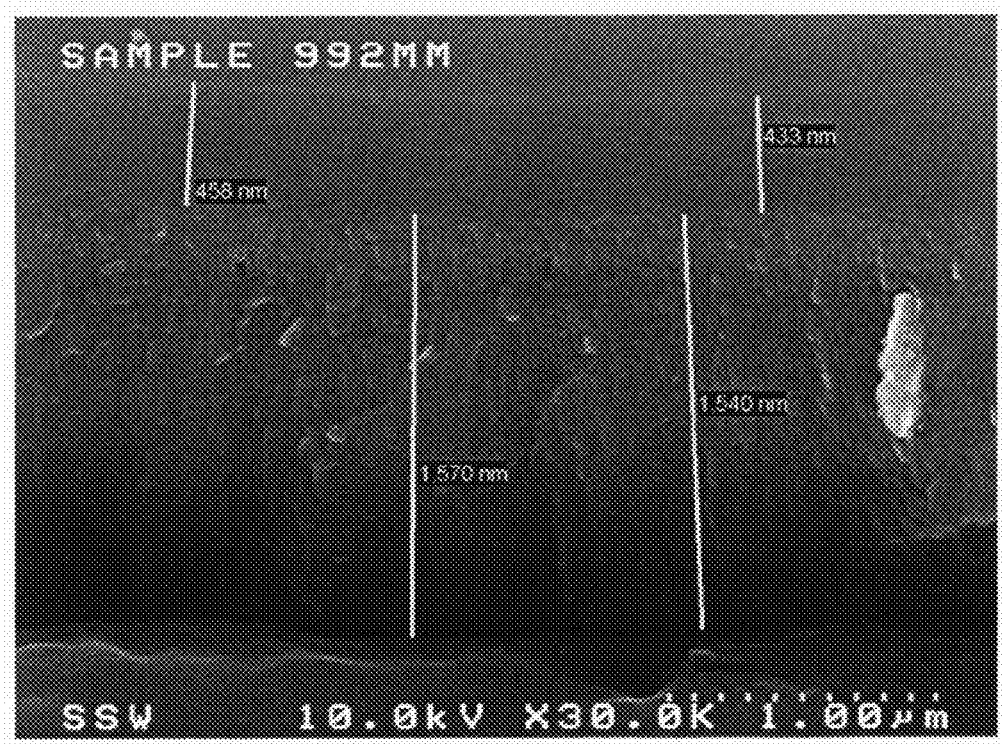
Figure 5C:
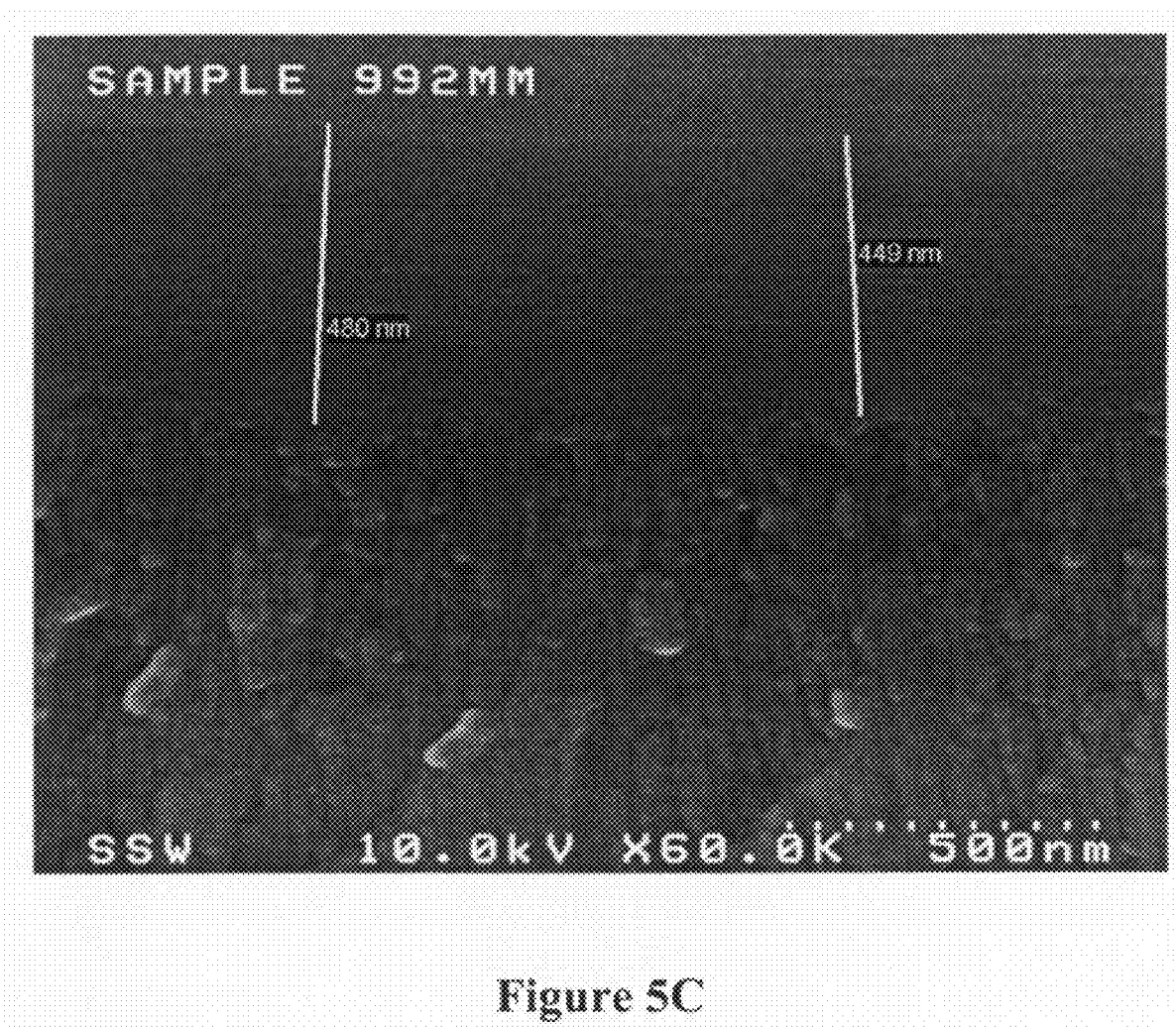
Figure 6A:
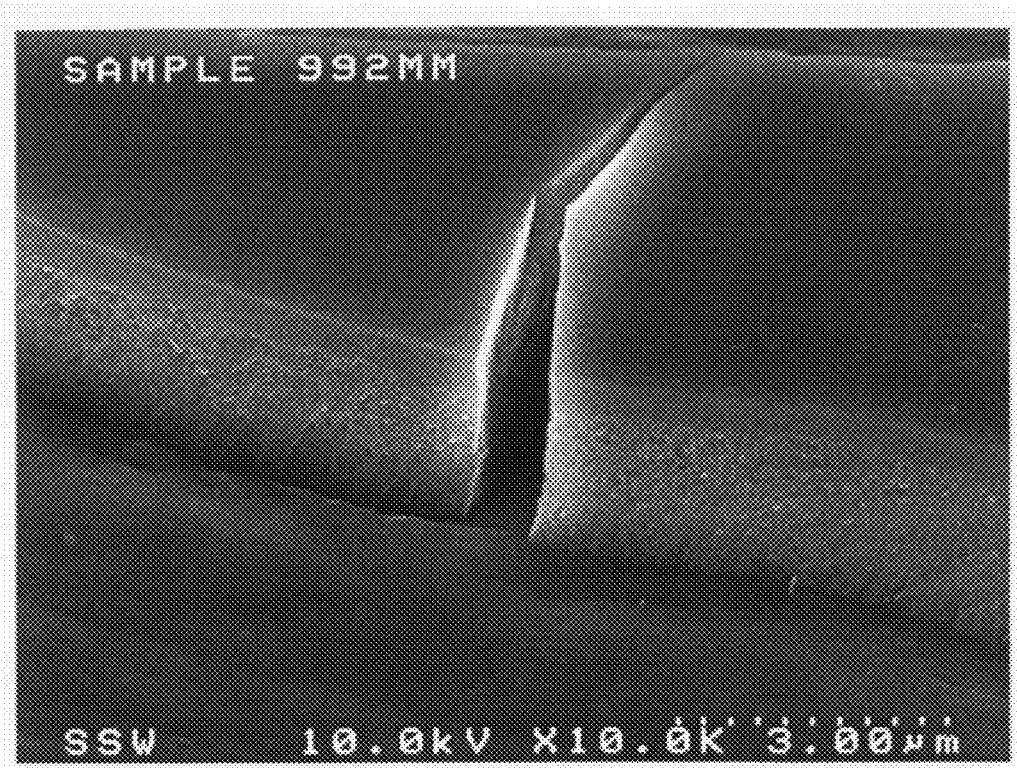
FIG. 6 is a pair of SEM photomicrographs of the metal product displayed in FIG. 5.
Figure 6B:
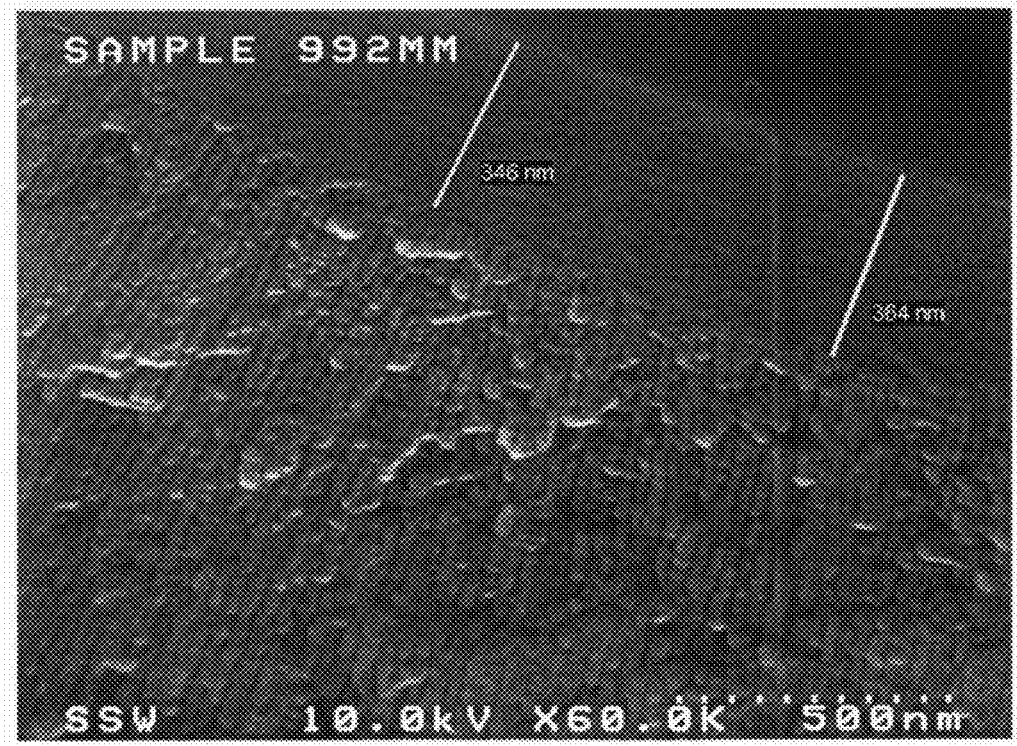
Figure 7A:
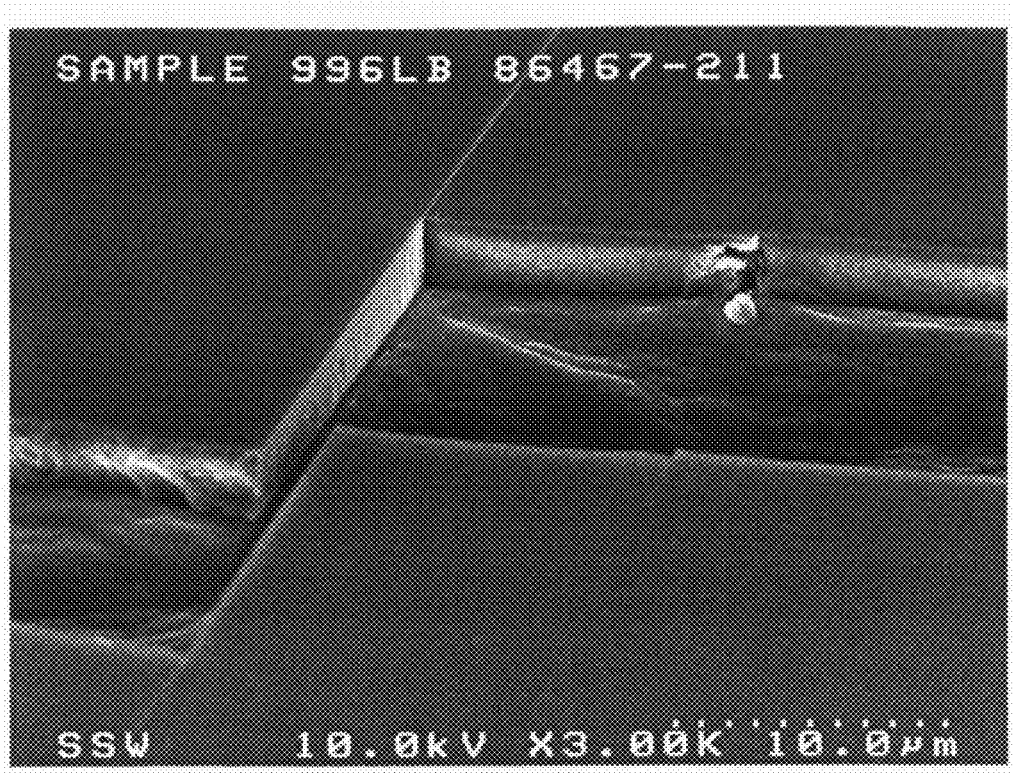
FIG. 7 is a pair of SEM photomicrographs of a metal product of the current disclosure.
Figure 7B:
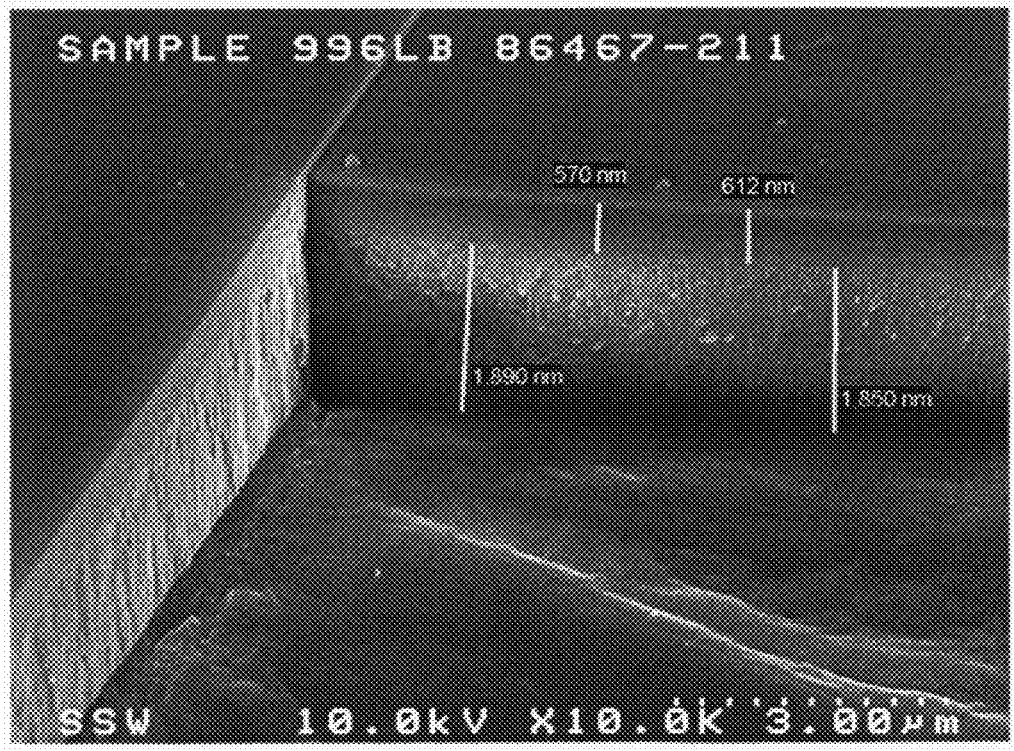
Figure 8A:
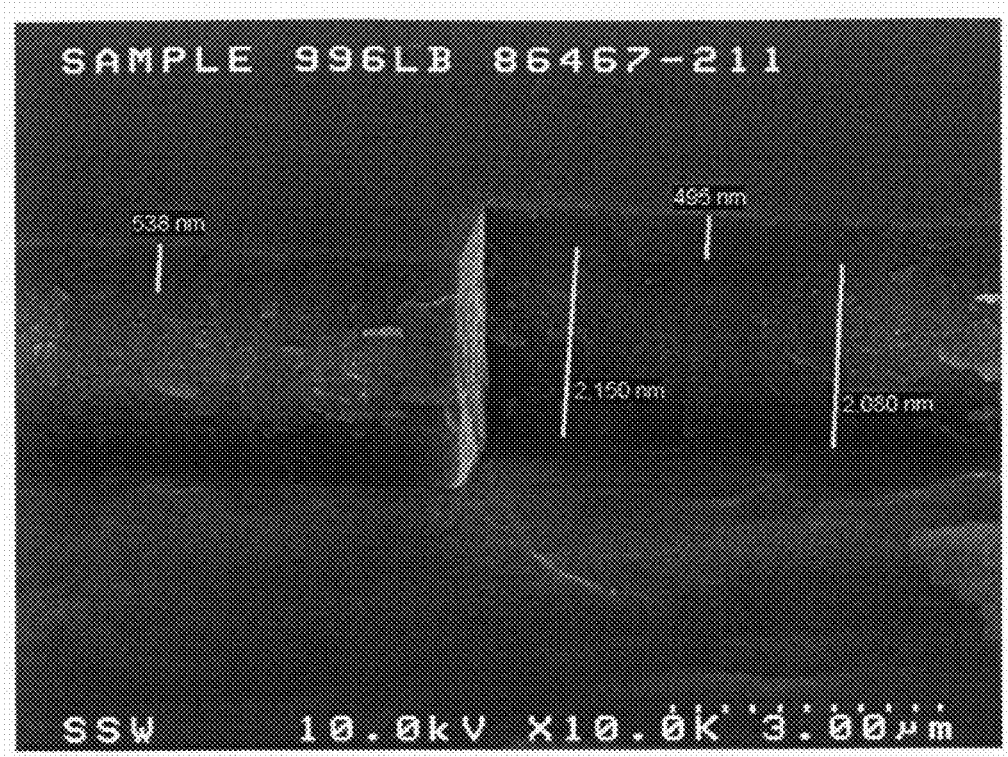
FIG. 8 is a pair of SEM photomicrographs the metal product displayed in FIG. 7.
Figure 8B:
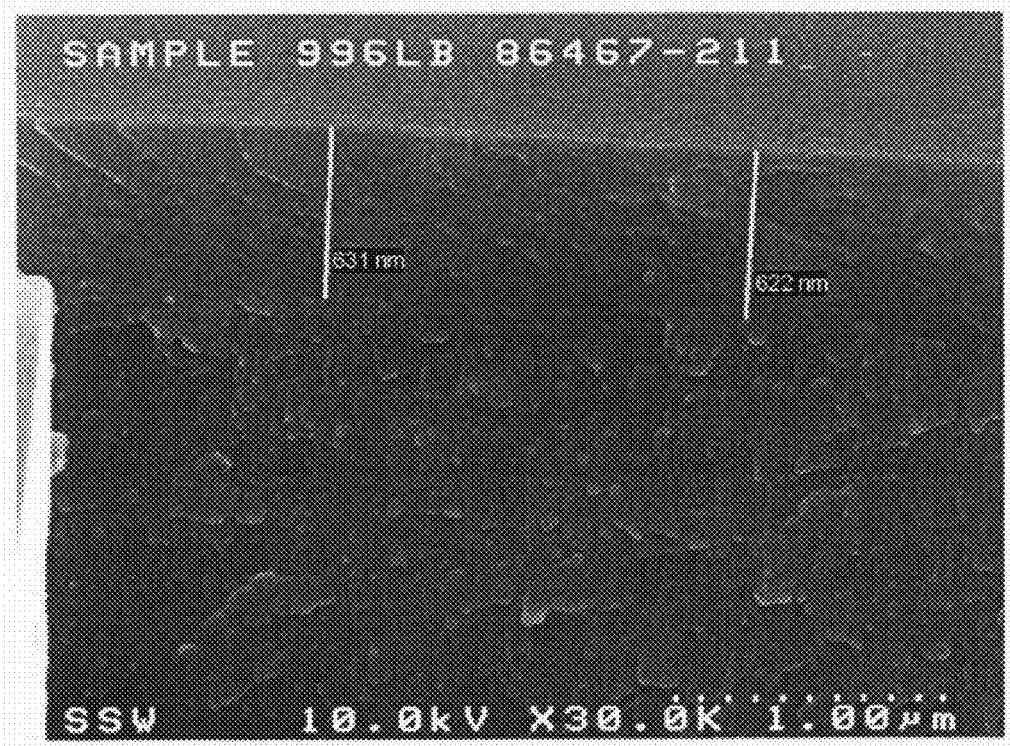

FIGS. 5 and 6 show SEM photos of another sample, freeze-fractured to reveal the cross-section. An oxide layer atop a metal surface can be seen, with a thickness of between 1.4 to about 1.6 microns. In addition, a silicate glass layer atop the oxide layer is also distinctly visible, with an oxide thickness of between about 340 and 480 nm. FIGS. 7 and 8 display another set of SEM photos for a sample that has been freeze-fractured to reveal the cross-section, demonstrating an oxide layer 1.85 to 2.15 microns thick that has been coated with a silicate glass layer between 570 and 630 nm thick Example 12

Figure 9:
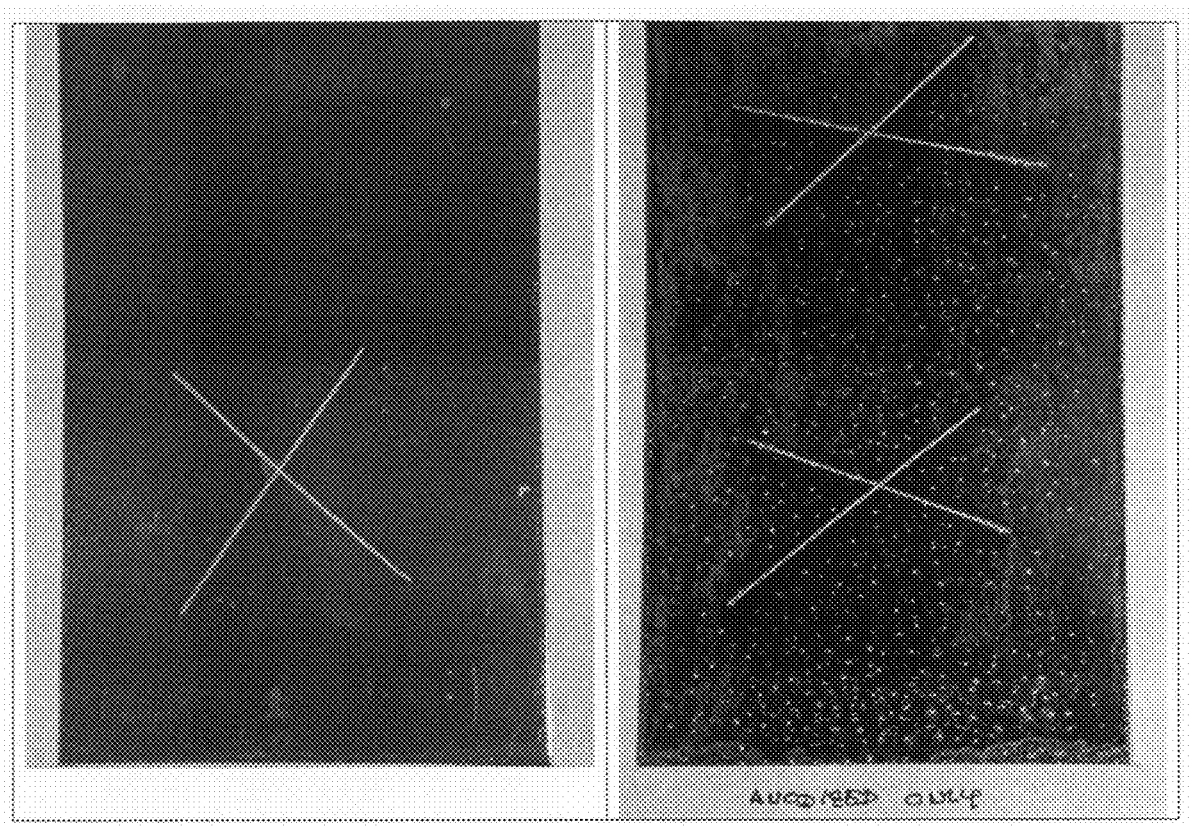
FIG. 9 is a photograph of two metal plates subjected to a Ford Filliform corrosion test.

FIG. 9 is a comparative example of the coating of the disclosure compared with an anodized and sealed aluminum sheet. The sheet of aluminum on the right hand side of FIG. 9 was anodized and sealed by insertion into boiling hot water. The specimen was then subjected to the Ford Motor Company filliform test including scratching of the surface of a sample and exposing the surface to a salt spray for 288 hours. The sample on the left was treated with the same anodizing step as the sample on the right, but was not sealed, and the silicate coating was applied according to Example 1. The same Ford filiform test was conducted, but the coated sample was treated for 800 hours. The sample on the right developed pock marks and some migration at the scratches in 288 hours. The sample on the left provided a continuous protective coating unaffected by the corrosive environment.

Example 13

The results of various tests performed on a coated aluminum metal product of the disclosure are set forth in Table I

TABLE I

| Test | Results |
|---|---|
| Salt Spray (ASTM B 117-37) | >1200 h, no surface effects |
| QUV (ASTM D4329) | >876 h |
| CASS-test (DIN 50 021) | >48 h, without significant Deterioration |
| Pencil Hardness | >>6H |
| Substrate Material Hard/Decorative Coating | Cr-plated brass Zr/ZrN (<1 μm thick)) |
| Total Reflection on bright surface | 86.2 |
| Specular reflection Distinction | 76.4 |
| With grain | 97.4 |
| Haze 15° | 0 |
| Haze 2° | 0.38 |
| Cross Grain | 94.9 |
| Haze 15° | 0 |
| Haze 2° | 0.69 |

Example 14

Performance results are compared between a roll-coated aluminum sheet of the present disclosure and aluminum sheets prepared by a current state of the art methods of anodization and sealing (i.e. nickel acetate.) The results are set forth in Table II.

TABLE II

| Property | Silicate glass-coated aluminum product | Control |
|---|---|---|
| Reflection, specular Reflectance Clarity of image and Diffuseness under visible light | No change from control | Anodize and sealed reflector with 1.5 micron thick oxide layer |
| 8 degree hemispherical reflectance from 250 to 2500 un | Equal to or higher than control | same |
| Acetic acid salt spray (DIN50021 ESS) | High purity Al with 1.5 um thickness anodize: | High purity aluminum with standard anodization at 8 um anodize layer |
| | minor corrosion on <7% at 1000 hrs | Equivalent corrosion at 150 hrs |
| | High purity Al with 1.5 um thickness anodize: | High purity aluminum with standard anodization at 8 um anodize layer |
| | minor corrosion on <1% at 800 hrs | Equivalent corrosion at 100 hrs |
| | High purity Al with 1.5 um thickness anodize: | Anodized and sealed aluminum with layer thickness of 1-3 um |
| | no corrosion after 500 hrs | severely corroded (50% of surface removed) at 100 hrs. |

TABLE II-continued

| Property | Silicate glass-coated aluminum product | Control |
|---|---|---|
| Neutral salt spray ASTM B117-94 (ISO 9227) | 1.5 um thick oxide layer No corrosion after 3000 hrs, no discoloration | Anodize 2.5 um exhibits discoloration at 350 hrs |
| Neutral salt spray as above - degree hemispherical reflectance from 250 to 2500 un | <1.2% loss after 3000 hrs | FAILED |
| Acetic acid salt spray as above | <3.0% loss after 1000 hrs | FAILED |
| UV exposure (ASTM G154-06) | <1.5% loss of reflectance after 3000 hrs | <1% loss of reflectance after 3000 hrs |
| Scratch resistance | 0.75 um thick layer | equivalent to 4 um thick standard anodize and seal |
| Hot (70° C.) NaOH (8% solution) | Little attack at 5 min - 0.75 um thick layer | Deterioration at 1 min - 4 um thick layer, coating completely dissolve after 2-3 min. |
| Filiform Corrosion (GM9682P) | No corrosion, no undercutting at scribe 1000 hrs | |
| Peeling | No peeling or flaking | |
| Heat Resistance | No deterioration at 500° C. | |

Example 15

This example sets forth metal silicate coating solutions and parameters of those solutions that are useful in the current disclosure.

Figure 10:
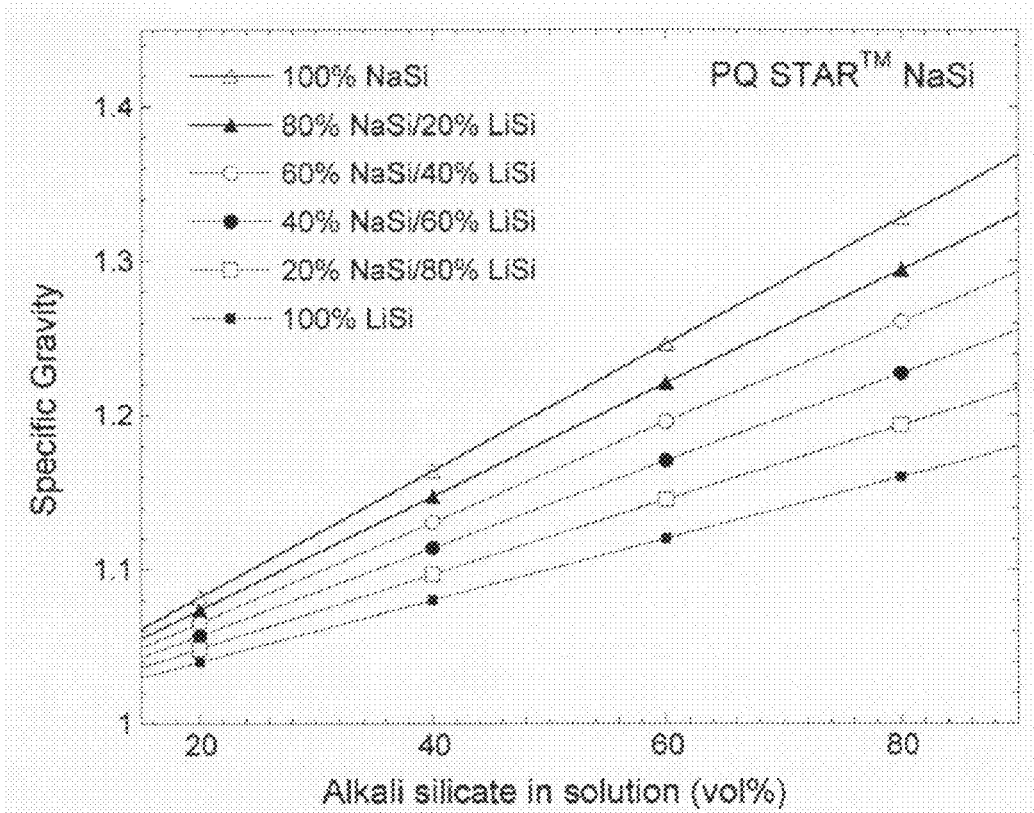
FIG. 10 is a pair of graphs showing solution parameters for coating solutions of the current disclosure.
Figure 10:
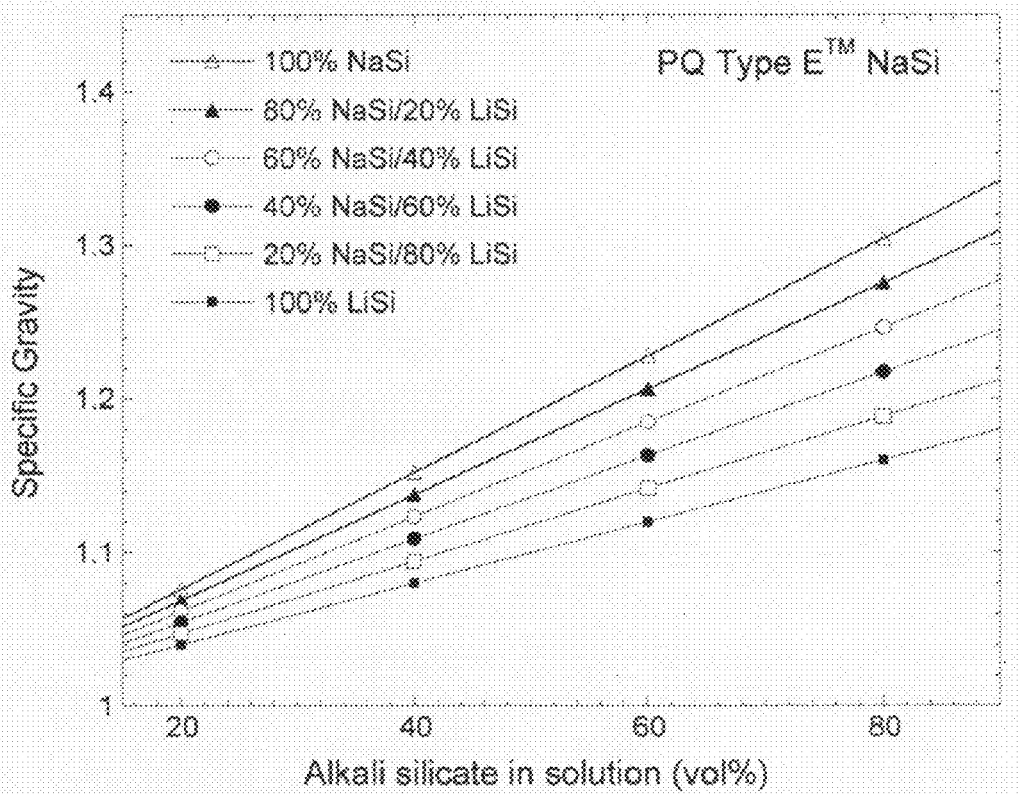

In FIG. 10, a series of metal silicate coating solutions can be prepared using a liquid sodium silicate and a liquid lithium silicate, with volume percentages and specific gravities determined for a range of solution. The upper graph shows a series with PQ STAR™ as the sodium silicate and PQ Lithisil25™ as the lithium silicate. Lower graph shows a series with using PQ Type E sodium silicate. The relative amounts of sodium silicate and lithium silicate are shown in the legend.

Figure 11:
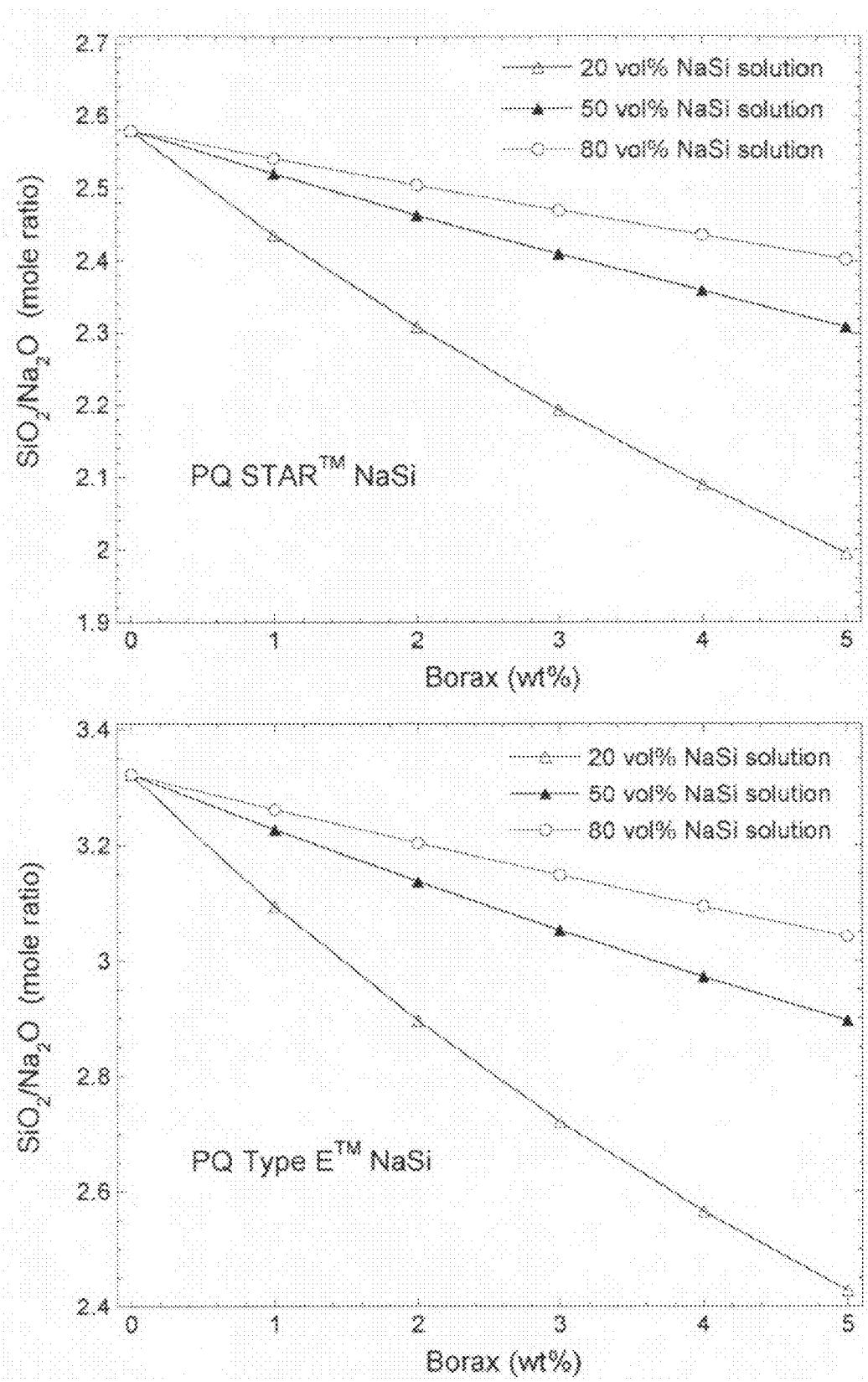
FIG. 11 is a pair of graphs showing solution parameters for coating solutions of the current disclosure.

In FIG. 11, a series of sodium silicate borate coating solutions have been prepared using either PQ STAR™ (upper graph) or PQ Type E™ (lower graph) sodium silicate and borax. Diluted solutions with 20 volume percent sodium silicate, 50 volume percent sodium silicate, and 80 volume percent sodium silicate have been prepared, as noted in the legend. The mole ratio of silicate to metal counterion and solution volume are shown based on the amount of borax in solution.

Figure 12:
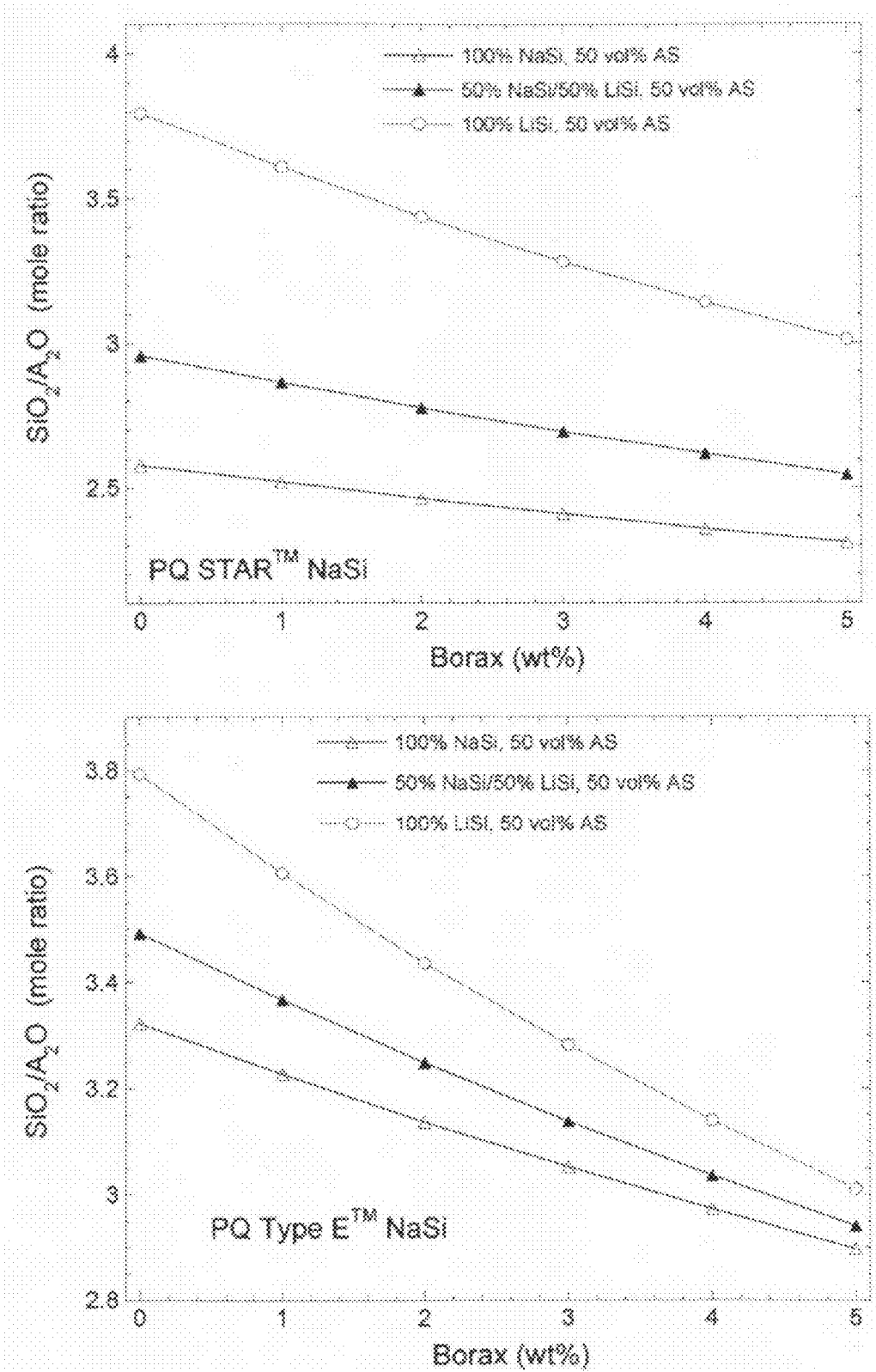
FIG. 12 is a pair of graphs showing solution parameters for coating solutions of the current disclosure.

In FIG. 12, a series of metal silicate borate coating solutions have been prepared using PQ STAR™ (upper graph) or PQ Type E™ (lower graph) as a sodium silicate, PQ Lithisil25™ as the lithium silicate, and borax as the source of metal borate. Mole ratios ($SiO_2/A_2O$ (alkali)) of diluted aqueous solutions made with liquid alkali silicate as a function of the amount of borax (sodium tetraborate decahydrate) dissolved in the solution are shown. In this case $A_2O$ means the total of $Na_2O$ and $Li_2O$. The amount of borax is defined as mass of borax per mass of diluted solution. Solutions are at a 50% volume silicate solution in water.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A process for preparing a metal product having a silicate glass layer, the process comprising:
providing a metal or metal alloy having a tightly adhered, prepared oxide layer that has a thickness in a range of about 50 nm to about 10 microns;
applying a coating layer having a thickness of less than about 20 microns to the prepared oxide layer, the coating layer comprising an aqueous silicate solution which is stable against gelling; then
heating the metal or metal alloy to a temperature in a range of about 200° C. to about 500° C.; and
forming an oxide-glass layer that comprises a transitional interface layer and a silicate glass layer and has a thickness in a range of about 0.1 microns to about 10 microns.

2. The process of claim 1, wherein providing a metal or metal alloy having a tightly adhered, prepared oxide layer comprises:
anodizing a surface of the metal or metal alloy to form the tightly adhered, prepared oxide layer.

3. The process of claim 1, wherein the metal or metal alloy is selected from the group consisting of Zn, Mn, Mg, Al, Ti, Fe, Cr, Ni, Pb and combinations thereof.

4. The process of claim 3, wherein the metal or metal alloy is selected from the group consisting of Al, Ti, Cr, Mn or Ni and combinations thereof.

5. The process of claim 1, wherein the aqueous silicate solution comprises metal counterions and the aqueous silicate solution has a specific gravity in a range of about 1.05 to about 1.30.

6. The process of claim 5, wherein the specific gravity is in the range of about 1.10 and about 1.20.

7. The process of claim 5, wherein the specific gravity is in the range of about 1.13 and about 1.17.

8. The process of claim 5, wherein the metal counterions comprise Na and at least one other metal counter ion is selected from the group consisting of Li, K, and combinations thereof.

9. The process of claim 8, wherein the metal counterions comprise at least about 10 atom % Na.

10. The process of claim 5, wherein the aqueous silicate solution comprises a metal borate.

11. The process of claim 10, wherein the metal borate comprises borax or sodium tetraborate in an amount up to about 5% by weight of the solution.

12. The process of claim 10, wherein the aqueous silicate solution comprises the metal borate in an amount ranging from about 1% to about 4% by weight.

13. The process of claim 1, wherein the temperature is in the range of about 220° C. to about 500° C.

14. The process of claim 1 further comprising curing the oxide-glass layer at a temperature in a range of about 200° C. to about 500° C. for about 15 seconds to about 1 hour.

15. The process of claim 1, wherein the coating layer has a thickness of less than about 15 microns.

16. The process of claim 1, wherein the thickness of the oxide-glass layer is in the range of 0.1 microns to about 5 microns.

17. The process of claim 16, wherein the thickness of the oxide-glass layer is in the range of 0.1 microns to about 3 microns.

18. The process of claim 17, wherein the thickness of the oxide-glass layer is in the range of 0.1 microns to about 2 microns.

19. The process of claim 1, wherein the metal or metal alloy is aluminum or an aluminum alloy.

20. The process of claim 1, wherein the aqueous silicate solution consists essentially of an alkali metal silicate, borax, at least one $C_1$ to $C_6$ alcohol, and water.

21. The process of claim 1, wherein the coating layer consists essentially of the aqueous silicate solution.

22. The process of claim 21, wherein the aqueous silicate solution consists essentially of an alkali metal silicate, borax, at least one $C_1$ to $C_6$ alcohol, and water.

23. A process for preparing a silicate glass layer on an anodized aluminum coil, the process comprising:
    providing an anodized aluminum oxide layer that has a thickness in a range of about 50 nm to about 10 microns on an aluminum coil;
    feeding the aluminum coil that carries the anodized aluminum oxide layer on a roll coat line;
    applying a stable aqueous silicate solution to the anodized aluminum oxide layer; and then
    heating the aluminum coil to a temperature in a range of about 200° C. to about 350° C. for at least about 15 seconds.

24. The process of claim 23 further comprising
    cooling the aluminum coil with water; and then
    rewinding the aluminum metal into a coil.

25. The process of claim 23, wherein the aqueous silicate solution comprises a metal borate and a metal silicate selected from the group consisting of lithium silicate, sodium silicate, potassium silicate, and a combination thereof.

26. The process of claim 23, wherein applying the aqueous silicate solution to the anodized aluminum oxide layer comprises forming a coating layer having a thickness of less than about 15 microns.

27. A process for preparing a reflective metal product comprising:
    providing a metal or metal alloy having a reflectance and carrying a tightly adhered, prepared oxide layer that has a thickness in a range of about 50 nm to about 10 microns; then
    applying a stable aqueous silicate solution to the prepared oxide layer;
    heating the metal or metal alloy to a temperature in a range of about 200° C. to about 500° C.; and
    forming a metal or metal alloy carrying an oxide-glass layer that has a loss in reflectance of less than about 2%, the oxide-glass layer comprising a transitional interface layer and a silicate glass layer and having a thickness in a range of about 0.1 microns to about 10 microns.

* * * * *